US008659670B2

(12) United States Patent
Liang et al.

(10) Patent No.: US 8,659,670 B2
(45) Date of Patent: Feb. 25, 2014

(54) MOTION INFORMATION ASSISTED 3A TECHNIQUES

(75) Inventors: Liang Liang, San Diego, CA (US); Ruben M. Velarde, San Diego, CA (US); Szepo R. Hung, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 378 days.

(21) Appl. No.: 12/629,668

(22) Filed: Dec. 2, 2009

(65) Prior Publication Data

US 2010/0265342 A1 Oct. 21, 2010

Related U.S. Application Data

(60) Provisional application No. 61/170,965, filed on Apr. 20, 2009.

(51) Int. Cl.
*H04N 5/222* (2006.01)
(52) U.S. Cl.
USPC ............ 348/208.4; 348/222.1; 348/362
(58) Field of Classification Search
USPC ............. 348/208.4, 222.1, 362–364
See application file for complete search history.

(56) References Cited

U.S. PATENT DOCUMENTS

| | | | |
|---|---|---|---|
| 6,418,168 | B1 | 7/2002 | Narita |
| 6,573,930 | B2 | 6/2003 | Kyuma et al. |
| 7,525,590 | B2 | 4/2009 | Murata et al. |
| 7,546,026 | B2 | 6/2009 | Pertsel et al. |
| 2003/0197795 | A1* | 10/2003 | Schinner .............. 348/255 |
| 2004/0061801 | A1* | 4/2004 | Hata .................. 348/350 |
| 2005/0128343 | A1* | 6/2005 | Murata et al. ......... 348/362 |
| 2005/0248660 | A1 | 11/2005 | Stavely et al. |
| 2007/0058966 | A1 | 3/2007 | Irinouchi et al. |
| 2007/0211161 | A1 | 9/2007 | Okamoto |
| 2007/0248330 | A1 | 10/2007 | Pillman et al. |

FOREIGN PATENT DOCUMENTS

| | | |
|---|---|---|
| CN | 1697488 A | 11/2005 |
| EP | 0409161 | 1/1991 |
| EP | 1662806 A1 | 5/2006 |
| JP | 06311416 | 11/1994 |
| JP | 2000152253 A | 5/2000 |
| JP | 2000278688 A | 10/2000 |

(Continued)

OTHER PUBLICATIONS

International Search Report and Written Opinion—PCT/US2010/031666, International Search Authority—European Patent Office—Sep. 27, 2010.

(Continued)

*Primary Examiner* — Gevell Selby
(74) *Attorney, Agent, or Firm* — Espartaco Diaz Hidalgo

(57) ABSTRACT

A method for adjusting parameters in a video capture device using motion information is disclosed. Motion information that indicates motion of a video capture device is determined. The motion information is compared to an upper bound and a lower bound. An aggressiveness level that indicates a change in a white balance gain for the video capture device is determined based on the comparison. A new white balance gain for the video capture device is determined based on the aggressiveness level. An exposure convergence holding time is adjusted based on the motion information. An exposure step size is increased based on the motion information. A brightness level of the video capture device is adjusted based on the convergence step size.

35 Claims, 16 Drawing Sheets

(56) References Cited

FOREIGN PATENT DOCUMENTS

| JP | 2001036923 A | 2/2001 |
| JP | 2008-035167 | 2/2005 |
| JP | 2008085996 A | 4/2008 |
| JP | 2009508381 A | 2/2009 |
| WO | 2007031890 A1 | 3/2007 |
| WO | WO2007085004 | 7/2007 |
| WO | WO2008039551 | 4/2008 |

OTHER PUBLICATIONS

Partial International Search Report—PCT/US2010/031666—International Search Authority, European Patent Office, Aug. 5, 2010.

Wonwoo Jang et al., "Auto white balance system using adaptive color samples for mobile devices, LNKDDOI: 10.1109/APCCAS.2008.4746307, XP031405280 ISBN: 978-1-4244-2341-5," Circuits and Systems, IEEE Asia Pacific Conference on, IEEE, 2008, 1462-1465.

Taiwan Search Report—TW099110799—TIPO—Jun. 20, 2013.

* cited by examiner

MOTION INFORMATION ASSISTED 3A TECHNIQUES

CLAIM OF PRIORITY UNDER 35 U.S.C. §119

The present Application for patent claims priority to Provisional Application No. 61/170,965 entitled "MOTION VECTOR ASSISTED 3A TECHNIQUES" filed Apr. 20, 2009, and assigned to the assignee hereof.

TECHNICAL FIELD

The present disclosure relates to digital video. Specifically, the present disclosure relates to motion information assisted 3A techniques.

BACKGROUND

Video capture devices, such as digital video cameras, may be used in different applications and environments. A video capture device may be capable of capturing video from a variety of distances relative to a target scene. Video capture devices may store captured video on a variety of media, e.g., video tape, hard drive, Digital Versatile Disk (DVD), etc.

Digital video capture devices may use a video sensor to capture video. The video capture device may include a number of video sensor configuration parameters that may be adjusted to better capture video in different environmental conditions. For example, the video capture device may include a number of sensitivity settings, e.g., white balance, exposure control, and focusing. Each of these settings may affect the smoothness and quality of captured video.

A video capture device may allow a user to manually select video sensor configuration parameters. By manually selecting the configuration parameters, the user may select settings appropriate for current environmental conditions to better capture video in that environment. Alternatively, or additionally, video capture devices may include some automatic settings that select the sensor configuration parameters based on current environmental conditions. The video capture devices may, for example, include light sensors that detect the brightness of the surrounding environment and select the configuration setting based on the amount of light detected. Many video capture devices also include automatic focusing of the camera. Video capture devices typically have many different parameters and settings that affect the quality of the video being taken. Therefore, there is a need for improved techniques for adjusting parameters in a video capture device.

DETAILED DESCRIPTION

Figure 1A:
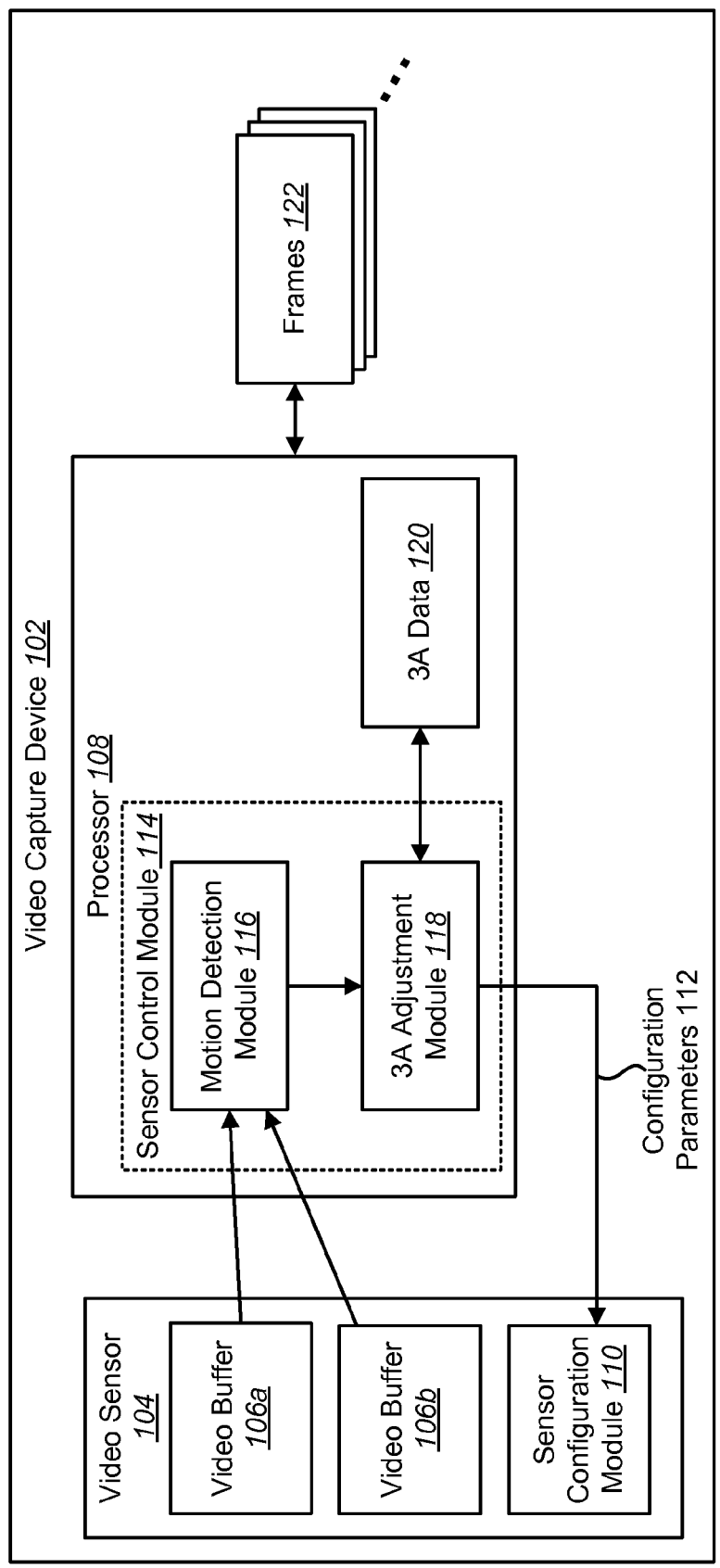
FIG. 1A is a block diagram illustrating a video capture device that adjusts parameters using motion information.

A method for adjusting parameters in a video capture device using motion information is described. Motion information is determined by a video capture device that indicates motion of the video capture device. The motion information is compared to an upper bound and to a lower bound. An aggressiveness level is determined based on the comparison. The aggressiveness level indicates a change in a white balance gain for the video capture device. A new white balance gain for the video capture device is determined based on the aggressiveness level.

The motion information may be determined using data received from an accelerometer in the video capture device. The motion information may include an estimated average velocity of the video capture device. The motion information may be a motion vector. Determining a motion vector may include summing pixel values in each row of a first frame to form a first column vector. Pixel values in each row of a second frame may be summed to form a second column vector. Pixel values in each column of the first frame may be summed to form a first row vector. Pixel values in each column of the second frame may be summed to form a second row vector.

A first shift needed to reach a peak value of autocorrelation of the first row vector and the second row vector may be determined. The first shift may be a horizontal component of the motion vector. A second shift needed to reach a peak value of autocorrelation of the first column vector and the second column vector may be determined. The second shift may be a vertical component of the motion vector.

Determining the aggressiveness level may include setting the aggressiveness level to zero if a length of the motion vector is less than or equal to the lower bound. The aggressiveness level may be set to a value that is proportional to the length of the motion vector if the length of the motion vector is greater than the lower bound and less than the upper bound. The aggressiveness level may be set to a predetermined maximum if the length of the motion vector is greater than or equal to the upper bound.

A change from an old white balance gain to a new white balance gain may be bigger for a large aggressiveness level than for a small aggressiveness level. Determining the new white balance gain may include using an equation: new white balance gain=old gain*(1−w)+current gain*w. Old gain is the old white balance gain for a previous frame, current gain is a white balance gain for a current frame, and w is the aggressiveness level. An exposure convergence holding time may be adjusted based on the motion information. An exposure step size may be increased based on the motion information. A brightness level of the video capture device may be adjusted based on the convergence step size.

Increasing an exposure step size may be dependent on a length of a motion vector. Determining if the video capture device is panning may be based on the motion information. Performing auto focus in the video capture device may be based on the panning determination. Performing auto focus may include not performing auto focus if panning is detected and performing auto focus if panning is not detected.

An apparatus for adjusting parameters in a video capture device based on motion information is described. The apparatus includes a processor, memory in electronic communication with the processor, and instructions stored in the memory. The instructions are executable by the processor to determine motion information that indicates motion of a video capture device. The instructions are also executable by the processor to compare the motion information to an upper bound and to a lower bound. The instructions are further executable to determine an aggressiveness level based on the comparison. The aggressiveness level indicates a change in a white balance gain for the video capture device. The instructions are also executable to determine a new white balance gain for the video capture device based on the aggressiveness level.

A computer-program product for adjusting parameters in a video capture device is also described. The computer-program product includes a computer-readable medium having instructions thereon. The instructions include code for determining motion information that indicates motion of a video capture device. The instructions also include code for comparing the motion information to an upper bound and a lower bound. The instructions further include code for determining an aggressiveness level based on the comparison. The aggressiveness level indicates a change in a white balance gain for the video capture device. The instructions also include code for determining a new white balance gain for the video capture device based on the aggressiveness level.

An apparatus for adjusting parameters in a video capture device is described. The apparatus includes means for determining motion information that indicates motion of a video capture device. The apparatus also includes means for comparing the motion information to an upper bound and a lower bound. The apparatus further includes means for determining an aggressiveness level based on the comparison. The aggressiveness level indicates a change in a white balance gain for the video capture device. The apparatus also includes means for determining a new white balance gain for the video capture device based on the aggressiveness level.

A method for adjusting parameters in a video capture device based on motion information is also described. Motion information is determined by a video capture device that indicates motion of the video capture device. An exposure convergence holding time is adjusted based on the motion information. An exposure step size is increased based on the motion information. A brightness level of the video capture device is increased based on the convergence step size.

Increasing an exposure step size may be dependent on a length of the motion vector. Adjusting the exposure convergence holding time may include reducing the exposure convergence holding time by forty percent to sixty percent. A drop in the brightness level to a value outside a predetermined range of a luma target may be detected.

An apparatus for adjusting parameters in a video capture device based on motion information is described. The apparatus includes a processor, memory in electronic communication with the processor, and instructions stored in the memory. The instructions are executable by the processor to determine motion information that indicates motion of a video capture device. The instructions are also executable by the processor to adjust an exposure convergence holding time based on the motion information. The instructions are further executable by the processor to increase an exposure step size based on the motion information. The instructions are also executable by the processor to adjust a brightness level of the video capture device based on the convergence step size.

A computer-program product for adjusting parameters in a video capture device is described. The computer-program product includes a computer-readable medium having instructions thereon. The instructions include code for determining motion information that indicates motion of a video capture device. The instructions also include code for adjusting an exposure convergence holding time based on the motion information. The instructions further include code for increasing an exposure step size based on the motion information. The instructions also include code for adjusting a brightness level of the video capture device based on the convergence step size.

An apparatus for adjusting parameters in a video capture device is also described. The apparatus includes means for determining motion information that indicates motion of a video capture device. The apparatus also includes means for adjusting an exposure convergence holding time based on the motion information. The apparatus further includes means for increasing an exposure step size based on the motion information. The apparatus also includes means for adjusting a brightness level of the video capture device based on the convergence step size.

Motion vectors may be used to determine motion in a video capture device: still, panning, or others. Additionally, light condition changes may result in the adjustment of 3A (Auto-Exposure, Auto-White Balance, Auto-Focus). In one configuration, 3A adjustment is based on sensor-received statistics without using any motion vector related information. However, the panning motion of a video capture device may also result in the adjustment of 3A, which produces a smooth point-and-converge process. Therefore, the present systems and methods may adjust parameters in a video capture device using motion information. With motion information, the 3A adjustment may become a smart motion-aware control. In other words, motion information may be used in 3A adjustment to achieve the desired smooth point-and-converge performance during panning while keeping the original 3A adjustment design for still scene light condition changes.

FIG. 1A is a block diagram illustrating a video capture device 102 that adjusts parameters using motion information. A video sensor 104 may include two video buffers 106a-b, both of which may store video information, e.g., pixel values, pertaining to a captured video frame. The video sensor 104 may, for example, store the video information in the video buffers 106 during video preview. More specifically, the video sensor 104 may store video information in the video buffers 106 while the user is pointing the video capture device 102 at the scene of interest, but before the user actuates a button to capture the video, i.e., a record button. In one configuration, the video sensor 104 may capture and store the videos in the video buffers 106 within seconds, if not milliseconds or even shorter time periods, of one another. In this case, the video sensor 104 may store successive sets of video information pertaining to the same scene of interest in the video buffers 106. This video information may then be stored as frames 122 of a captured video. This successive video buffering technique may occur unnoticed by a user attempting to capture the video. That is, from the user's perspective, only a single video may be captured via actuation of a button on the video capture device 102. In another configuration, the video capture device 102 may include more or less than two video buffers 106.

The video buffers 106 may include any volatile or non-volatile memory or storage device, such as FLASH memory, or such as a magnetic data storage device or optical data storage device. In an alternative configuration, the video buffers 106 may reside outside of the video sensor 104, such as within other modules of the video capture device 102, including a processor 108.

The video sensor 104 may also include a video sensor configuration module 110 that configures the video sensor 104 in accordance with configuration parameters 112 received from the processor 108. The configuration parameters 112 received from video processor 108 may include a white balance gain, an exposure convergence holding time, an auto exposure step size, or a panning determination to be used during auto focus. The video sensor 104 may expose video sensor elements to the scene of interest in accordance with the configuration parameters 112 to capture the video. In particular, based on the configuration parameters 112, the video sensor configuration module 110 may perform auto white balancing, auto exposure control, and/or auto focusing. Auto white balancing may be the adjustment of color intensities in captured frames 122. Auto exposure control may be the adjustment of an exposure convergence holding time and/or an exposure step size that determines the brightness level of captured frames. Auto focusing may be the adjusting of a lens apparatus to clearly focus on a targeted object or group of objects.

The processor 108 on the video capture device 102 may include a sensor control module 114. The sensor control module 114 may include a motion detection module 116 that determines the amount of motion within the scene of interest. More specifically, the motion detection module 116 may generate one or more indicators that identify changes between the frames of a continuous video stream that are indicative of motion. This may include calculating global motion vectors or local motion vectors. As used herein, the term "global motion vector" refers to a vector calculated using two or more frames in a video sequence. As used herein, the term "local motion vector" refers to a vector calculated using two or more sub-frames in a video sequence. In other words, a global motion vector may indicate movement of everything or almost everything from one frame to another, i.e., a global motion vector may indicate movement of the video capture device 102 itself. In contrast, a local motion vector may indicate movement of a portion of a frame from one frame to another, i.e., a local motion vector indicates that something being filmed has moved relative to its environment, but the video capture device 102 has not necessarily moved. As used herein, the term "motion information" refers to global motion vectors, local motion vectors, or any other data that indicates movement of a video capture device 102 or movement of something being filmed by a video capture device 102, e.g., data from an accelerometer in the video capture device 102.

A 3A adjustment module 118 may analyze the motion information generated by the motion detection module 116, and adjust one or more configuration parameters 112 of the video sensor 104 based on the amount of motion detected between two frames 122. Although discussed herein as adjusting an auto white balance gain, an auto exposure control delay, and/or an auto exposure control step size, the 3A adjustment module 118 may adjust other configuration parameters of the video sensor 104. In general, the 3A adjustment module 118 may increase the auto white balance gain of the video sensor 104 for scenes that include a relatively large amount of global motion. This may result in faster auto white balance convergence during motion, thus reducing color tone jitter in the captured video. The 3A adjustment module 118 may also decrease the auto exposure control delay and increase the auto exposure control step size during scenes with relatively large amounts of global motion. This may result in a faster convergence to a target luma value, e.g., the brightness level of captured video may be corrected faster during panning The 3A adjustment module 118 may also turn off auto focus during scenes with relatively large amounts of global motion. This may eliminate unwanted focusing during panning.

The processor 108 may also include 3A data 120 that is used by the 3A adjustment module 118 to determine the configuration parameters 112. The 3A data 120 may, for example, include a plurality of different configuration parameters 112 for the different operating modes of the camera that may be chosen by a user. Furthermore, the 3A data 120 may include data about the current configuration parameters 112 that may be used by the 3A adjustment module 118 to produce future configuration parameters 112. In one configuration, the 3A adjustment module 118 may select initial configuration parameters 112 for the video sensor 104 based on brightness, and adjust the configuration parameters 112 of the video sensor 104 based on analysis of subsequent motion information.

Figure 1B:
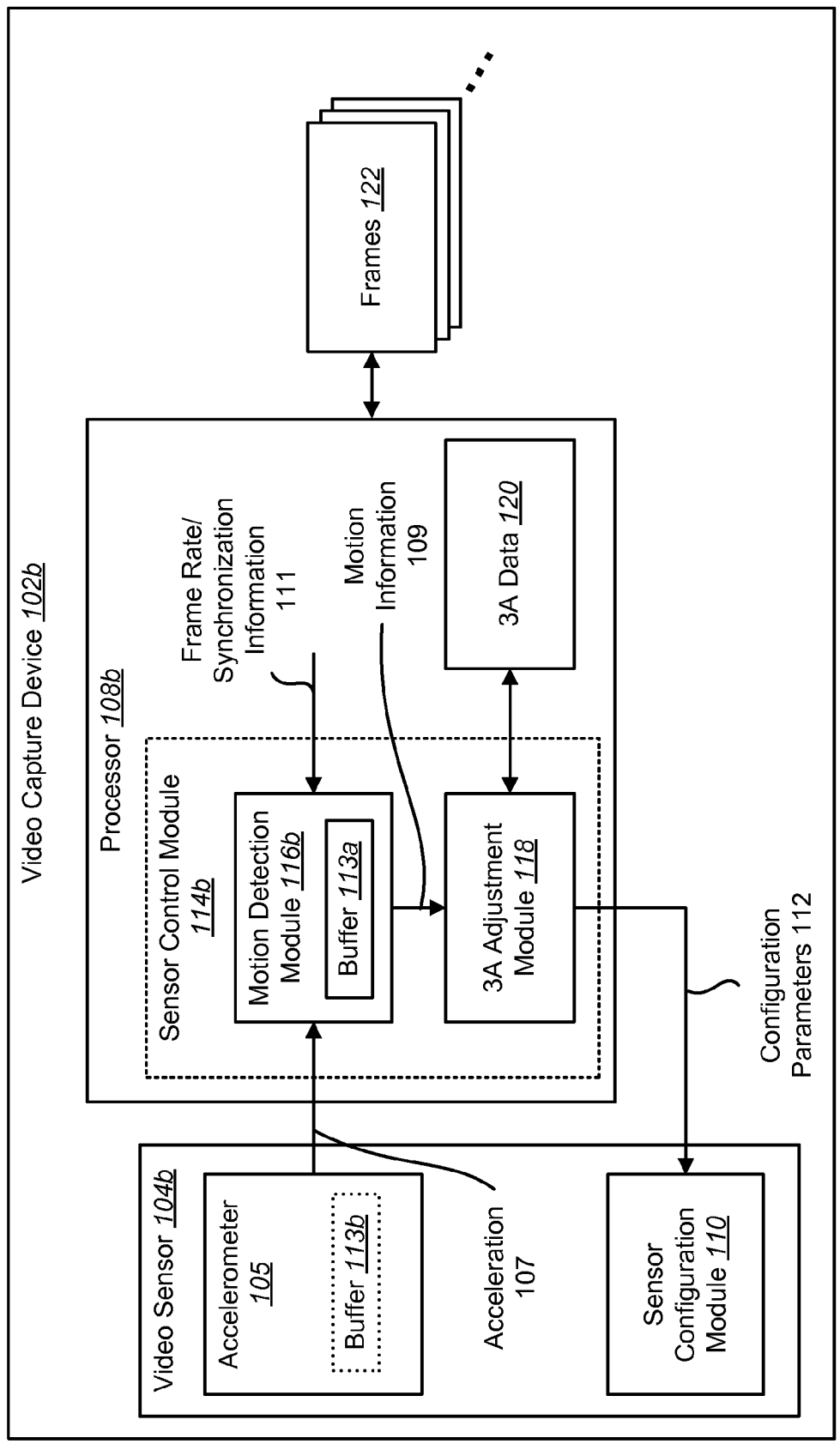
FIG. 1B is a block diagram illustrating another video capture device that adjusts parameters using motion information.

FIG. 1B is a block diagram illustrating another video capture device 102b that adjusts parameters using motion information 109. The video capture device 102b of FIG. 1B may be one configuration of the video capture device 102 of FIG. 1A. The video capture device 102b may include a video sensor 104b. The video sensor 104b may include an accelerometer 105. The accelerometer 105 may provide acceleration a 107 to a motion detection module 116b. The acceleration 107 may be in x,y,z coordinates. The motion detection module 116b may be part of a sensor control module 114b on a processor 108b. The sensor control module 114b of FIG. 1B may have similar functions as the sensor control module 114 of FIG. 1A. The processor 108b of FIG. 1B may have similar functions as the processor 108 of FIG. 1A.

The motion detection module 116b may use the acceleration 107 to determine the velocity v=at and distance moved $$s = \frac{at^2}{2}.$$

For example, if the accelerometer 105 provides an estimated acceleration a 107 and the frame rate is 30 frames/second, the motion detection module 116b may determine the velocity and distance using t=1/30 seconds. The motion detection module 116b may then determine the change in velocity and the change in distance. If the change in distance or the change in velocity are almost constant (no abrupt large change), then a panning process is initially found. The convergence speed may be switched from a normal mode to a motion information (MI) assisted convergence mode. In MI assisted convergence mode, the convergence speed may depend on the estimated current $\bar{\nabla}_j$, where $\bar{\nabla}_j$ is the estimated average velocity of the video capture device 102b over the latest 1 second.

To determine $\bar{\nabla}_j$, the change in velocity for each frame may be determined. Then, $$\overline{V}j = \frac{1}{N}\sum_{i=1}^{N} \Delta Vi$$

may be computed where N is the current frame rate. The change in velocity for each frame may be determined using a buffer 113*a* in the motion detection module 116*b*. Alternatively, the change in velocity for each frame may be determined using a buffer 113*b* in the accelerometer. With each new frame, statistics for the new frame may be input into the buffer 113. The convergence speed may then be calculated as a function of $\overline{V}_j$. If $\overline{V}_j$ has an abrupt change, an interruption of the panning process is detected. The convergence mode may then be switched back to normal mode.

Figure 2:
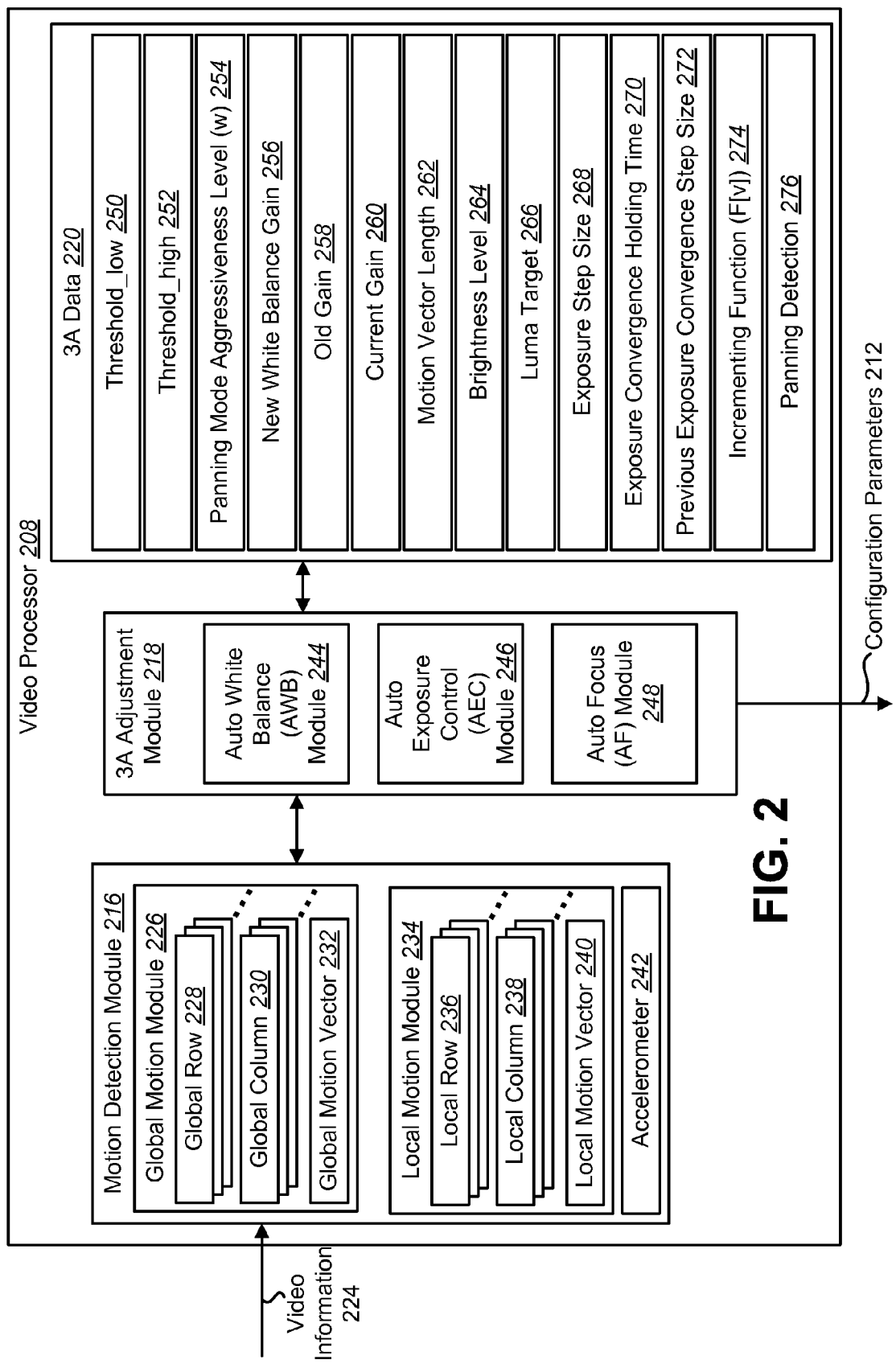
FIG. 2 is a block diagram illustrating a video processor that produces configuration parameters from video information.

The motion detection module 116*b* may receive the frame rate/synchronization information 111. The frame rate/synchronization information 111 may be received from the video sensor 104*b*, the processor 108*b*, or elsewhere in the video capture device 102*b*. The frame rate/synchronization information 111 may include the synchronization information between the frame index and the velocity index. The motion detection module 116*b* may then output motion information 109 to a 3A adjustment module 118. The motion information 109 may include $\overline{V}_j$. The other components of the video capture device 102*b* of FIG. 1B may perform in a similar manner to the components of the video capture device 102 of FIG. 1A FIG. 2 is a block diagram illustrating a video processor 208 that produces configuration parameters 212 from video information 224. The video information 224 may be received from one or more video buffers 106 and may include frames 122 or portions of frames 122 within a captured video stream. A motion detection module 216 may determine a global motion vector 232 or a local motion vector 240 from the video information 224.

Motion vectors may be defined and computed in several ways. A global motion module 226 may compute global motion vectors 232 from global rows 228 and global columns 230 in one or more frames. In contrast, a local motion module 234 may compute a local motion vector 240 for an N×M block in a frame, e.g., using local rows 236 and local columns 238. Specifically, a local motion vector 240 may be obtained by predicting motion in the temporal domain based on neighboring frames. These computations may be very complex depending on the size of the blocks and the search range in the neighboring frames. Motion information may also be detected by an accelerometer 242 built into a video capture device 102.

The motion detection module 216 may determine motion information and send it to a 3A adjustment module 218 that may produce configuration parameters 212 using 3A data 220. The 3A adjustment module 218 may include an auto white balancing (AWB) module 244, an auto exposure control (AEC) module 246, and an auto focus (AF) module 248.

The auto white balance module 244 may determine a new white balance gain 256 based on motion information. In real world usage condition, the light source for a filmed video may not change very often. However, depending on the scene, an auto white balance decision may result in jittery captured video. Without a temporal filter (to slow down the white balance (WB) gain change), a user may notice very annoying color tone jitter in preview operation, as well as in the recorded videos and the continuous snapshots. Therefore, a fixed-parameter temporal filter may be used to adjust the white balance convergence process in the auto white balance module 244. Specifically, a relatively long (around or more than 10 seconds) white balance convergence process may be applied in order to achieve a smooth AWB transition when the light temperature changes. Furthermore, 3 fixed aggressiveness levels (w) may be used for the camera mode in a video capture device 102: w(low)=0.05, w(med)=0.15, w(high)=0.45. Additionally, one fixed aggressiveness level (w) may be used for general camcorder mode in a video capture device 102: w=0.025. With this fixed-aggressiveness level, the auto white balance gain 256 may converge smoothly (over around 10 sec.) when the light temperature changes. The white balance for a video frame may be adjusted according to Equation (1):

new white balance gain=old gain*(1−*w*)+current gain**w*    (1)

where the new white balance gain 256 is the white balance gain actually applied to the video front end, (i.e., sensor configuration module 110), old gain 258 is the white balance gain of the previous frame (e.g., based on lighting conditions), and current gain 260 is the white balance gain for the current frame (e.g., based on lighting conditions).

During panning, however, it may be desirable for the auto white balance convergence to be a smooth point-and-converge process. Therefore, motion information may be used to detect the panning movement of the video capture device 102 and assist the auto white balance module 244 to make the appropriate adjustment. If the panning motion is detected, the auto white balance convergence period may be reduced by adjusting the parameters of the temporal filter. In other words, using general camcorder mode with fixed aggressiveness may not converge fast enough during a panning process, i.e., using a fixed aggressiveness level may allow auto white balance decision instability when there is no panning but auto white balance is in an indecisive situation. In order to solve this problem, the auto white balance module 244 may use a panning-aware auto white balance convergence technique that allows the auto white balance to converge in a smooth and point-to-converge fashion during panning process, but allows no auto white balance instability. This may be performed using a panning mode aggressiveness level 254 that is adjusted based on motion information.

A panning mode aggressiveness level (w) 254 may be determined by Equation (2):

$$w = \begin{cases} 0 & \|MV\| \leq \text{Threshold\_low} \\ \alpha\|MV\| & \text{Threshold\_low} < \|MV\| < \text{Threshold\_high} \\ 0.05 & \|MV\| \geq \text{Threshold\_high} \end{cases} \quad (2)$$

where ∥MV∥ is the norm of the motion vector (i.e., motion vector length 262), Threshold_low 250 is a lower limit of the MV length 262, Threshold_high 252 is an upper limit for the MV length 262, and α is a scalar that keeps the value of the panning mode aggressiveness level (w) 254 within the range of (0, 0.05). Threshold_low 250 and Threshold_high 252 may be video capture device specific. Therefore, if the motion vector length 262 is less than or equal to Threshold_low 250, w may equal zero. In other words, the auto white balance gain 256 may not be updated by the current auto white balance gain 260, unless there is a sudden brightness change. Additionally, if the length of the motion vector is greater than or equal to Threshold_high 252, w may equal 0.05. Therefore, 0.05 may be the highest panning mode aggressiveness level 254 for camcorder mode. If, however, the motion vector length 262 is between Threshold_low 250 and Threshold_ high 252, w may increase proportionally to the motion vector length 262 (as scaled by α). Therefore, one of the configuration parameters 212 sent to a sensor configuration module 110 may be the new white balance gain 256 that is adjusted using the panning mode aggressiveness level 254.

Threshold_low 250 and Threshold_high 252 may depend on the way the motion vector is computed. Typically, hand jitter creates a certain amount of motion. However, the motion from hand jitter does not affect 3A data 220 convergence. Therefore, Threshold_low 250 may be determined by the hand motion triggered motion vector size. Threshold_high 252 may be determined by consistent panning motion in roughly the same direction. If the current frame and previous frame has a shift of ~10%, the amount of motion may be determined to be Threshold_high 252. Both Threshold_low 250 and Threshold_high 252 may be adjustable and tunable.

The auto exposure control module 246 may speed up an auto exposure control convergence process using motion information. Auto exposure control convergence may occur when the light intensity of a target scene changes. Auto exposure control convergence may be designed to start with an exposure convergence holding time 270 to prevent minor disturbances, followed by a smooth converging process back to a luma target 266, i.e., an exposure step size 268 may be adjusted until the brightness level 264 re-enters an acceptable range within a luma target 266.

During panning, it may be desirable for the auto exposure control convergence to be a point-and-converge process. As before, motion information may be computed to detect the panning movement of the video capture device 102, e.g., a global motion vector 232. If panning movement is detected, the auto exposure control (AEC) module 246 may reduce an exposure convergence holding time 270 and converge back to the luma target 266 in a fast but smooth process. In other words, when a video capture device 102 is not panning, the exposure convergence holding time 270 prevents disturbances. However, if panning is detected (from motion information), a shorter exposure convergence holding time 270 may be desirable. If panning is detected, the exposure convergence holding time 270 may be reduced by 40-60% of normal.

Furthermore, if panning motion is detected, the auto exposure control convergence process may also be sped up by increasing the exposure step size 268 based on the panning speed. In order to keep the convergence process as smooth as possible, the exposure step size 268 may only be increased or reduced by a factor within [0, 1], which is panning speed dependent. Equation (3) illustrates how an exposure step size 268 may be determined:

$$\text{Step\_Size(pan)} = \text{Step\_Size(org)} + F[V] \quad (3)$$

where Step_Size(pan) is the exposure step size 268 actually sent to a sensor configuration module 110, Step_Size (org) is the previous exposure step size 272, and F[V] is an incrementing function 274 that is dependent on the panning speed and is in the range [0,1]. The exposure step size can only be performance at an integer. The incrementing function (F[V]) 274 may be accumulated until it reaches an integer, then the corresponding exposure step size 268 may be increased or reduced by 1.

Therefore, two of the configuration parameters 212 sent to a sensor configuration module 110 may be the exposure convergence holding time 270 and the exposure step size 268 that is adjusted using an incrementing function 274.

The auto focus (AF) module 248 may decide whether to re-focus using motion information. It may be desirable to avoid re-focusing a video capture device 102 while it is panning Since the view of the video capture device 102 window is changing continuously with the panning movement, re-focusing during this process may cause indecisive focusing behavior, i.e., captured video may alternate rapidly between out-of-focus and in-focus. To avoid this, the auto focus module 248 may use motion vectors to determine when to re-focus. Specifically, if a panning motion of the video capture device 102 is detected, the video capture device 102 may not re-focus. Rather, re-focusing may proceed when the panning motion is stopped, as indicated by the length of the motion vectors. Motion vectors may also assist the auto focus module 248 to track the object of interest and help the auto focus module 248 to make accurate decisions by detecting scene changes.

One possible panning detection algorithm may use a focus value (FV) for panning detection that may be unreliable and inaccurate. This algorithm assumes that if there is no panning and object motion, the current FV and the average FV of the past three frames are identical or at least very close. If this difference is greater than 10% of the FV average of the past three samples, panning motion is detected. This is illustrated in Equation (4) where panning is detected if:

$$|FV_{current} - \overline{FV_{past3samples}}| > 10\% \times \overline{FV_{past3samples}} \quad (4)$$

However, this assumption may not be accurate since object movement may also satisfy this condition. In order to solve the problem of this auto focus panning detection algorithm, real motion information from the motion detection module 216 may be used to determine a panning detection 276. Global motion vectors 232 (computed from global rows 228 and global columns 230) may assist the auto focus module 248 with determining a panning detection 276. Local motion vectors 240 (block based motion vectors inside of the frames) may assist the auto focus module 248 with object tracking. Therefore, one of the configuration parameters 212 sent to a sensor configuration module 110 may be the panning detection 276 that is adjusted using the motion information from the motion detection module 216.

Figure 3:
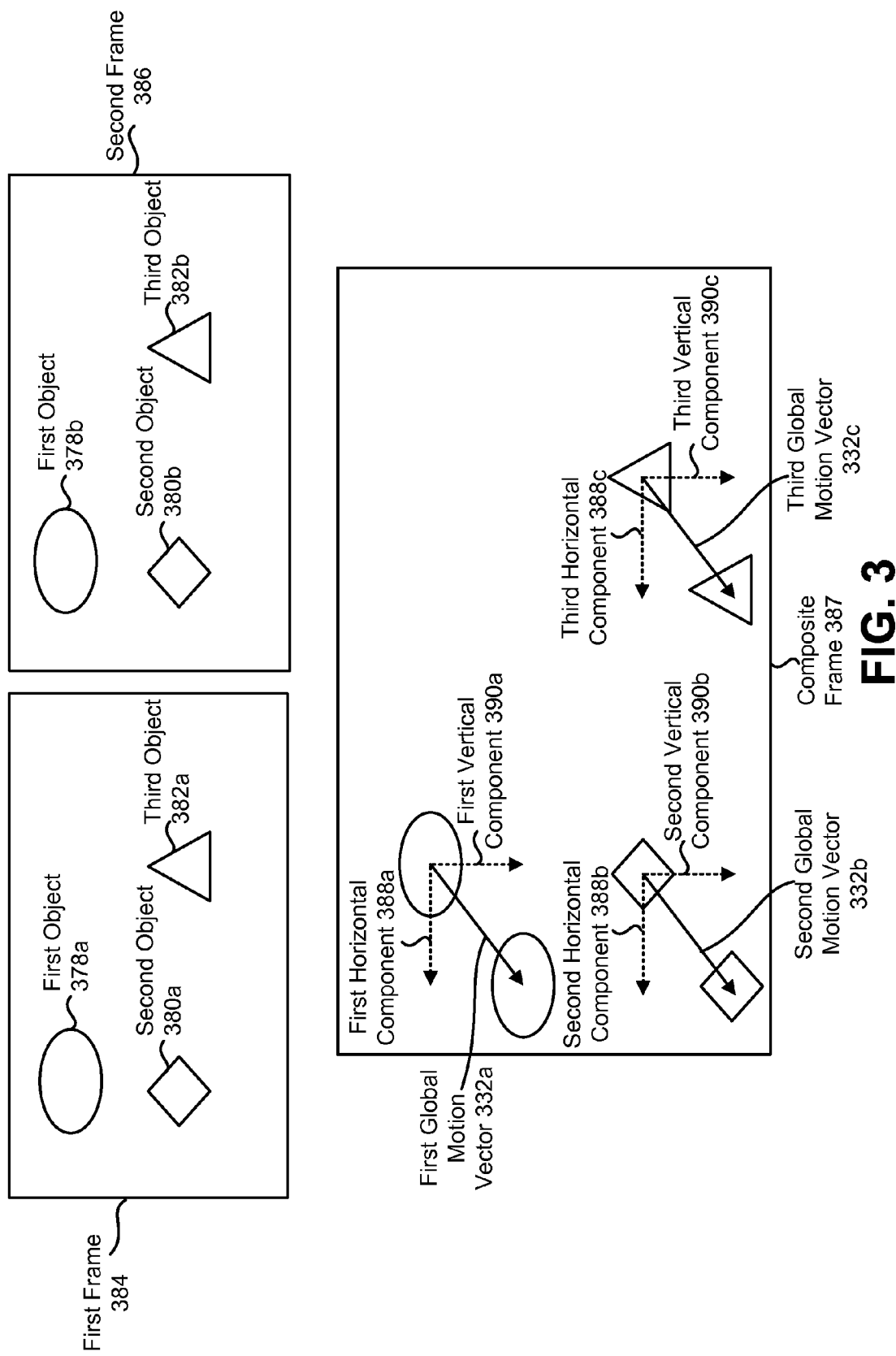
FIG. 3 is a block diagram illustrating global motion vectors.

FIG. 3 is a block diagram illustrating global motion vectors 332. Captured video may include many frames. A first frame 384 may include a first object 378a, a second object 380a, and a third object 382a in a particular configuration. A subsequently received second frame 386 may include the same objects that may be positioned the same relative to each other, but in a different position relative to the frame boundaries. In other words, the first object 378b, second object 380b, and third object 382b may also be in the second frame 386, but shifted in a particular direction. This may indicate global motion, i.e., movement of the video capture device 102. The global motion vector 332 may be the amount of shift in the entire scene. Therefore, a first global motion vector 332a, a second global motion vector 332b, and a third motion vector 332c may be identified based on shifts in different columns and/or rows of pixels in the frames 384, 386, but should be very similar. As shown in the composite frame 387, a global motion vector 332 may have a horizontal component 388a-c and a vertical component 390a-c.

To compute global motion vectors 332, a motion detection module 216 may generate 1-dimensional projection values for one or more frames and compare the projections of the frames to detect motion within the scene of interest. In particular, the motion detection module 216 may compute horizontal projections (global rows 228), vertical projections (global columns 230) or both for each frame. Horizontal projections are summations of the pixel values of a row of pixels of a frame, e.g., up to 1024 sub-sampled rows. Vertical projections are summations of the pixel values of a column of pixels of a frame, e.g., up to 1024 sub-sampled columns. For example, the motion detection module 216 may determine horizontal projections for a frame according to Equation (5):

$$P_H(j) = \sum_i Pix(i, j) \quad (5)$$

where $P_H(j)$ denotes the summation of the pixels in the jth row (i.e., i is a column index and j is a row index), and Pix(i, j) denotes the pixel value of the pixel in the ith column and jth row. The motion detection module 216 may also determine vertical projections for a frame according to Equation (6):

$$P_V(i) = \sum_j Pix(i, j) \quad (6)$$

where $P_V(i)$ denotes the summation of the pixels in the ith column. $P_H$, therefore is the summation of the x-axis pixel values (as i varies and j remains static) of a particular frame. Likewise, $P_V$ is the summation of the y axis pixel values (as i remains static and j varies) of a particular frame.

The global motion vector 332 may be estimated from the global rows 228 and global columns 230, i.e., a global column 230 of frame N+1 may represent a shifted global column 230 of frame N. The amount of shift may be the horizontal component 388 of the global motion vector 332. Likewise, a global row 228 of frame N+1 may be a shifted global row 228 of frame N. The amount of shift may be the vertical component 390 of the global motion vector 332. Once the vertical projections and horizontal projections for two frames have been determined, autocorrelation may be used to find the peak of the projections. The amount of shift needed to reach the peak is the global motion vector 332.

Additionally, in one configuration, a global motion vector 332 may be determined from 2 vectors. Given vector N and vector N+1 of the same length L, the cross-correlation F may be computed according to Equation (7):

$$F=\Sigma N(n)*N+1(n+k), n=0,\ldots,(L-1) \quad (7)$$

where n and k are indices. The index k may be varied in a search range from −S to +S, (search range is 10% of the vector length). A vector with an index less than zero or greater than or equal to L may be appended with zeros.

The k that generates the largest F may be the estimated motion vector. Since the global rows 228 and global columns 230 are large numbers, the product and sum of the two vectors may create even greater numbers and cause overflow with fixed point computation. Therefore, the cross-correlation computation may be implemented as Sum of Absolute Difference (SAD) according to Equation (8):

$$F=\Sigma abs(N(n)*N+1(n+k)), n=0,\ldots,(L-1) \quad (8)$$

with SAD, the k that produces smallest F value may be used as the motion vector.

Furthermore, the history of the past global motion vectors 332 may be placed in a queue for a 3A adjustment module 218 to utilize. The queue may be first-in first-out (FIFO) for motion vectors (dx, dy) for 1 second (30 frames). The 3A adjustment module 218 may use a current motion vector (the last entry in the history queue) and the past history to adjust its convergence speed and re-focusing decision. If the motion is too large and exceeds the search range, the index k that produces the largest F value (with cross-correlation) or the smallest F value (with SAD) in the search range may be used.

Figure 4:
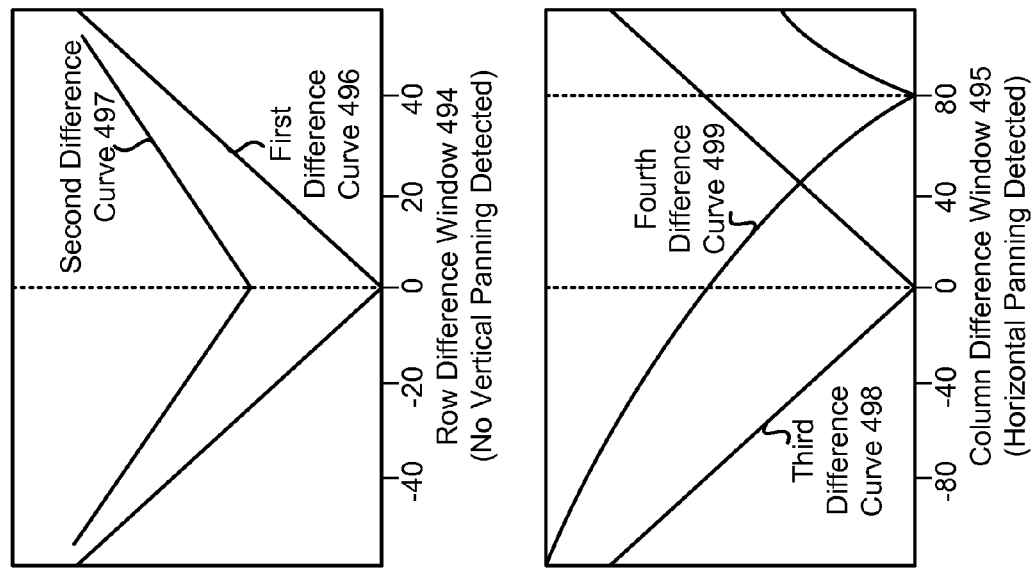
FIG. 4 is another block diagram illustrating global motion vectors.
Figure 4:
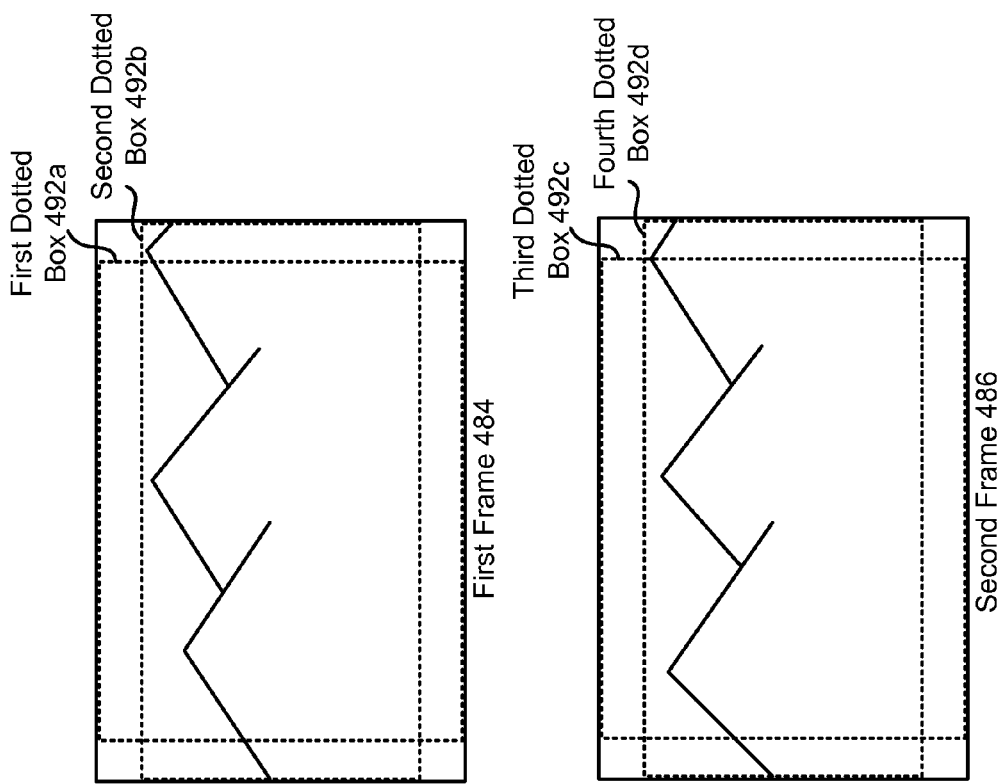

FIG. 4 is another block diagram illustrating global motion vectors 232. A first frame 484 illustrates a frame of video captured while a video capture device 102 is panning A second frame 486 illustrates a frame of video captured following the first frame 484, i.e., the mountains have shifted horizontally in the second frame 486 with respect to the first frame 484. The global rows 228 and global columns 230 may be determined for the area enclosed by the dotted boxes 492. For example the global rows 228 may be determined for the second dotted box 492b in the first frame 484 and the fourth dotted box 492d in the second frame 486 while the global columns 230 may be determined for the first dotted box 492a in the first frame 484 and the third dotted box 492c in the second frame 486. Alternatively, the global rows 228 may be determined for the first dotted box 492a and the third dotted box 492c and the global columns 230 may be determined for the second dotted box 492b and the fourth dotted box 492d. Alternatively, the global rows 228 and the global columns 230 may be determined for the area where the first dotted box 492a overlaps with the second dotted box 492b in the first frame 484 and the area where the third dotted box 492c overlaps with the fourth dotted box 492d in the second frame 486.

The second dotted box 492b and the fourth dotted box 492d may represent the windows/regions for computing the SAD of the row sum of the luminance Y (or red (R), green (G), blue (B)) in the neighboring two frames N and N+1 in order to detect panning motion in the vertical direction. The first dotted box 492a and the third dotted box 492c may represent the windows/regions for computing the SAD of the column sum of Y (or R, G, B) in the neighboring two frames N and N+1 in order to detect panning motion in the horizontal direction.

The row difference window 494 and the column difference window 495 illustrate how panning may be detected using the global rows 228 and global columns 230. The row difference window 494 illustrates a first difference curve 496 and a second difference curve 497. The first difference curve 496 may be the SAD between the first frame 484 and the second dotted box 492b. The second difference curve 497 may be the SAD between the first frame 484 and the fourth dotted box 492. The location of the first difference curve 496 in relation to the second difference curve 497 in the row difference window 494 indicates that no vertical panning is detected between the first frame 484 and the second frame 486.

Similarly, the column difference window 495 illustrates a third difference curve 498 and a fourth difference curve 499. The third difference curve may be the SAD between the first frame 484 and the first dotted box 492a. The fourth difference curve may be the SAD between the first frame 484 and the third dotted box 492c. The location of the third difference curve 498 in relation to the fourth difference curve 499 in the column difference window 495 indicates that horizontal panning has been detected.

FIG. 4 illustrates one example of how to detect panning motion using global motion vectors 232. Additional ways of panning detection by motion information may also be used.

Figure 5:
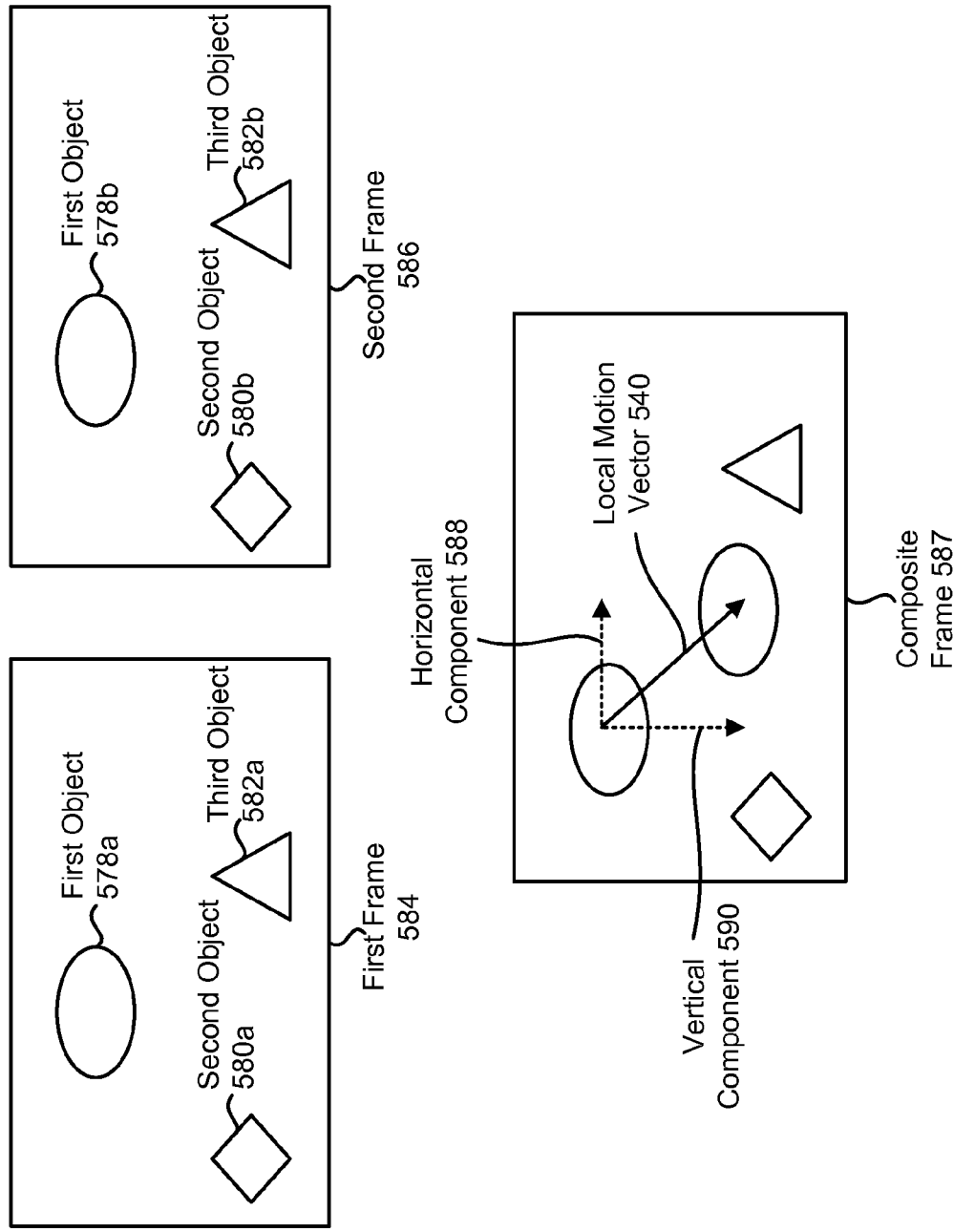
FIG. 5 is a block diagram illustrating a local motion vector.

FIG. 5 is a block diagram illustrating a local motion vector 540. A local motion vector 540 may indicate movement in a sub-block of a frame. A first frame 584 may include a first object 578a, a second object 580a, and a third object 582a in a particular configuration. A subsequently received second frame 586 may include the same objects, however in contrast to FIG. 3, the first object 578b may be in a different position but the second object 580b and third object 582b may be in the same or similar position. In other words, the first object 578b has moved while the second object 580b and third object 582b have not moved. This may indicate local motion, i.e., movement of a particular subject of filming, but not an entire scene. Therefore, the local motion vector 540 may indicate the movement of the first object 578 from the first frame 584 to the second frame 586. As shown in the composite frame 587, the local motion vector 540 may have a horizontal component 588 and a vertical component 590.

Figure 6:
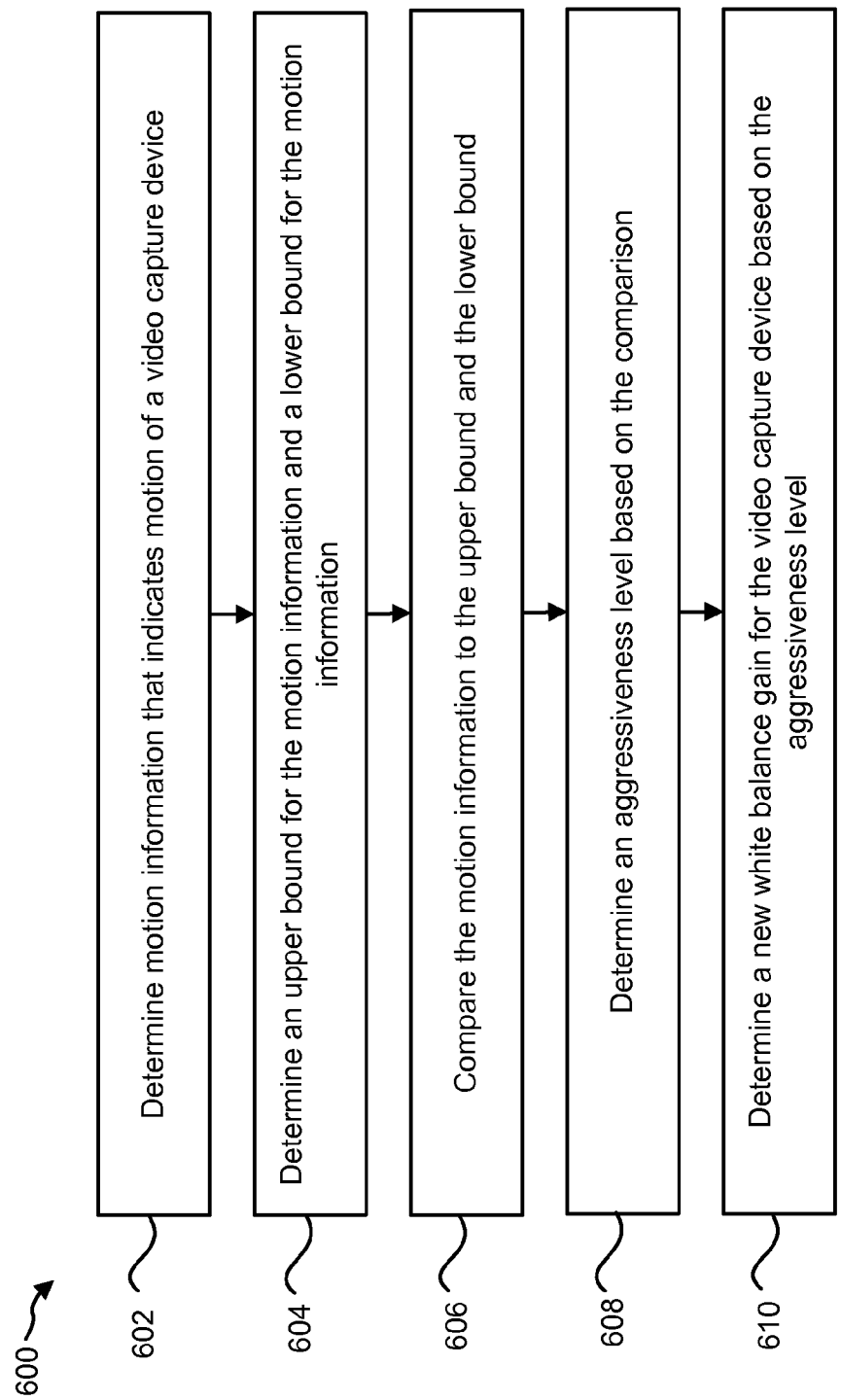
FIG. 6 is a flow diagram illustrating a method for determining a new white balance gain using motion information.

FIG. 6 is a flow diagram illustrating a method 600 for determining a new white balance gain 256 using motion information. The method 600 may be performed by a motion detection module 216 and an auto white balance module 244 in a video processor 208. The motion detection module 216 may determine 602 motion information that indicates motion of a video capture device 102, e.g., a global motion vector 232. The motion information may be a motion vector. Alternatively, other types of motion information may be used, e.g., data from an accelerometer 242. The auto white balance module 244 may determine 604 an upper bound for the motion information and a lower bound for the motion information, e.g., Threshold_high 252 and Threshold_low 250, respectively. The auto white balance module 244 may also compare 606 the motion information to the upper bound and the lower bound. The auto white balance module 244 may also determine 608 an aggressiveness level based on the comparison, i.e., determining a panning mode aggressiveness level 254 determined using Equation (2). The panning mode aggressiveness level 254 may indicate the change to the white balance gain in the video capture device 102, e.g., a large w may indicate that the new white balance gain 256 will be very different than the old white balance gain 258 and a small w may indicate that the new white balance gain 256 will not be very different than the old white balance gain 258. The auto white balance module 244 may also determine 610 a new white balance gain 256 for the video capture device 102 based on the aggressiveness level, i.e., applying the panning mode aggressiveness level 254 to Equation 1 to determine a new white balance gain 256. This new white balance gain 256 may be sent to a sensor configuration module 110 as a configuration parameter 112.

Figure 7:
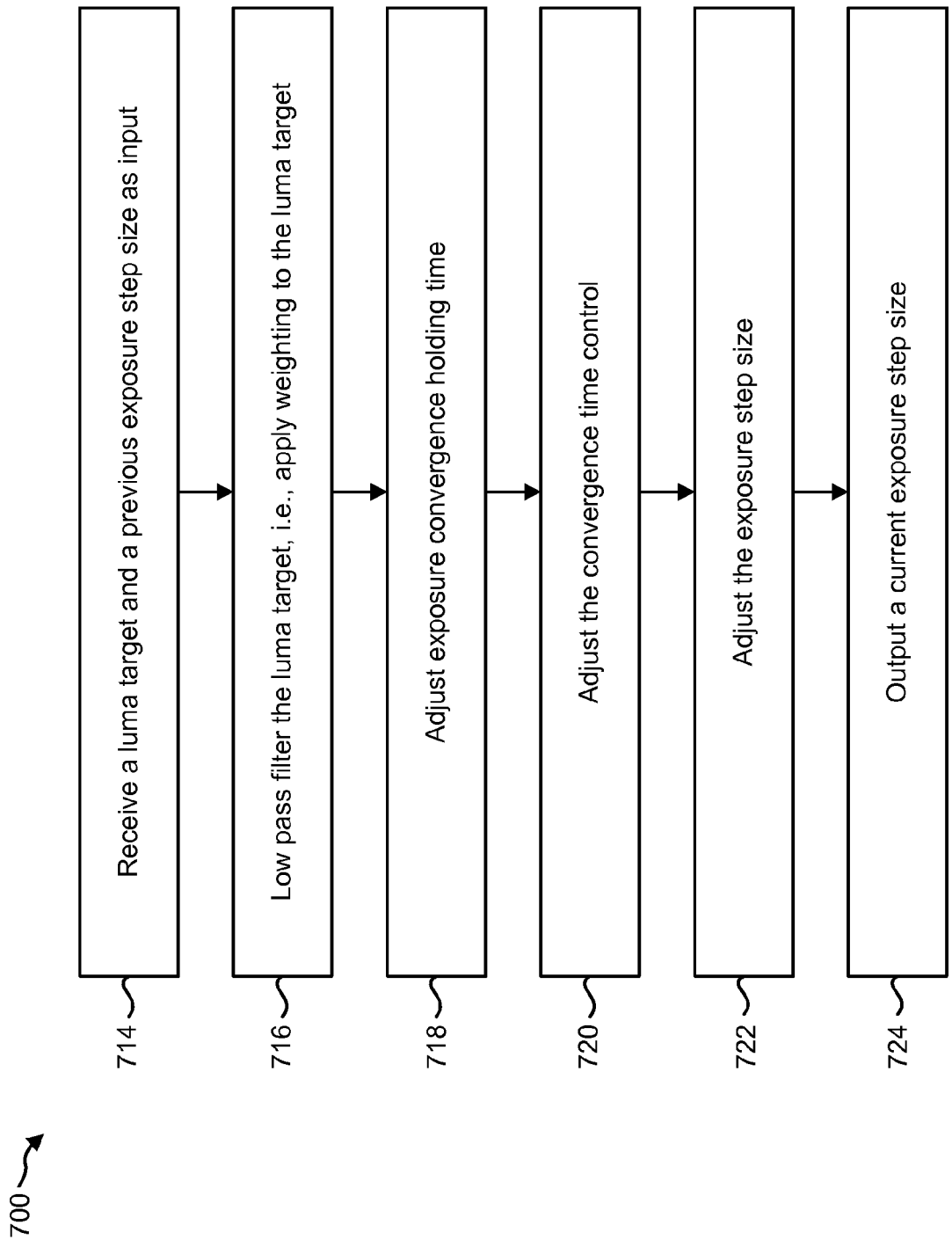
FIG. 7 is a flow diagram illustrating a method for auto exposure control.

FIG. 7 is a flow diagram illustrating a method 700 for auto exposure control. Auto exposure control may be the process of adjusting configuration parameters 212 so that a brightness level 264 in captured video converges to a luma target 266, or converges to within an acceptable range of the luma target 266. The method 700 may be performed by an auto exposure control module 246. The auto exposure control module 246 may receive 714 a luma target 266 and a previous exposure step size 272 as input. The auto exposure control module 246 may also low pass filter 716 the luma target 266, i.e., apply weighting to the luma target 266. The auto exposure control convergence process may then include three states: holding time control, convergence time control, and exposure step size control. The auto exposure control module 246 may adjust 718 the exposure convergence holding time 270. In one configuration, the exposure convergence holding time 270 is about one second to prevent minor disturbances. The auto exposure control module 246 may also adjust 720 the convergence time control. This may include adjusting a brightness level 264 back to the luma target 266 smoothly, i.e., with little or no oscillation or overshoot. The auto exposure control module 246 may also adjust 722 the exposure step size 268 based on the current stage during the convergence process and changes in the overall brightness level 264. The auto exposure control module 246 may also output 724 a current exposure step size 268.

In one configuration, the exposure convergence holding time 270 may be shortened using panning aware auto exposure control, e.g., the holding time 270 may be shortened to 40-60% of its value if panning is detected from motion information. Additionally, the exposure step size 268 may be increased if panning is detected to speed up the convergence of the brightness level 264 to the luma target 266, e.g., using Equation (3).

Figure 8:
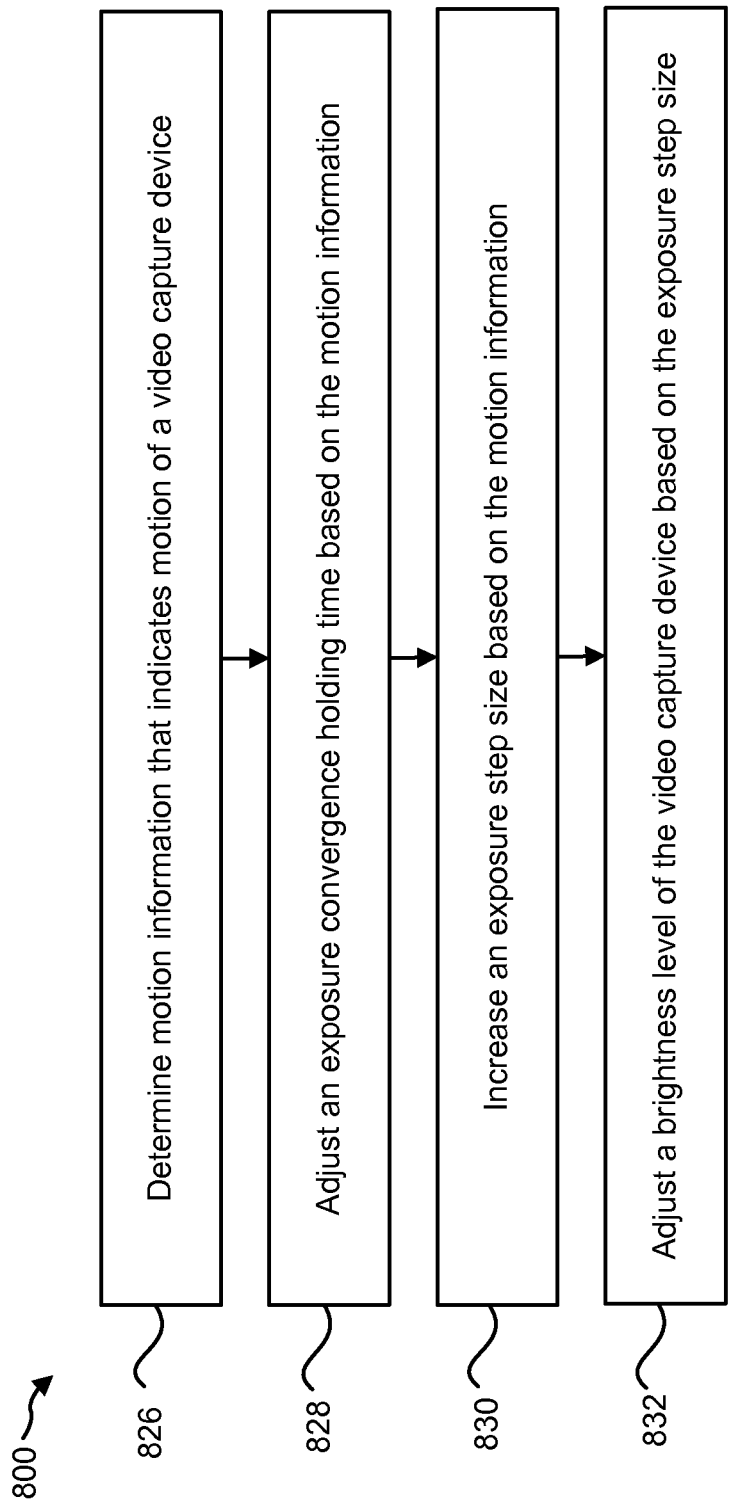
FIG. 8 is a flow diagram illustrating a method for panning aware auto exposure control in a video capture device.

FIG. 8 is a flow diagram illustrating a method 800 for panning aware auto exposure control in a video capture device 102. The method 800 may be performed by a motion detection module 216 and an auto exposure control module 246 in a video processor 208. The motion detection module 216 may determine 826 motion information that indicates motion of a video capture device 102, e.g., a global motion vector 232. The motion information may be a motion vector. Alternatively, other types of motion information may be used, e.g., data from an accelerometer 242. The auto exposure control module 246 may adjust 828 an auto exposure convergence holding time 270 based on the motion information, e.g., reduce the holding time 270 to 40-60% of its value if panning is detected from motion information. The auto exposure control module 246 may also increase 830 an exposure step size 268 based on the motion information. This may include determining exposure step size 268 according to Equation (3) using a previous exposure step size 272 and an incrementing function (F[V]) 274. The auto exposure control module 246 may also adjust 832 a brightness level of the video capture device 102 based on the exposure step size 268.

Figure 9:
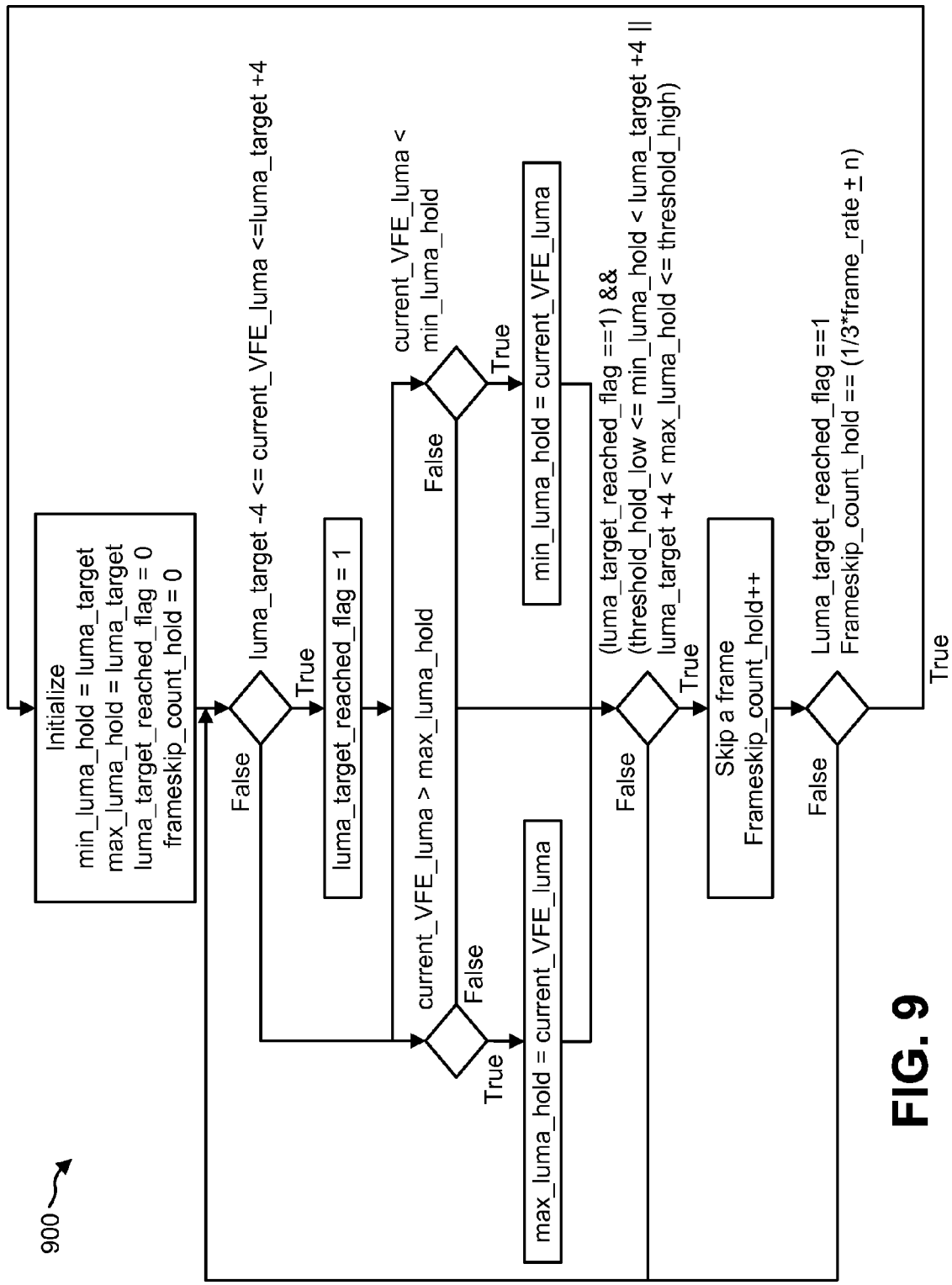
FIG. 9 is a flow diagram illustrating a method for holding time control during auto exposure control.

FIG. 9 is a flow diagram illustrating a method 900 for holding time control during auto exposure control. In other words, the method 900 illustrated in FIG. 9 may be performed instead of step 718 in the method 700 illustrated in FIG. 7. The method 900 may be modified if panning is detected based on motion information, i.e., the holding time 270 may be reduced by 40-60%. The method 900 may be performed by an auto exposure control module 246. The holding time control may be achieved by skipping certain frames to prevent instantaneous brightness convergence. Holding time control may be performed when the following conditions are satisfied: (1) the brightness level 264 is out of the luma target 266 tolerance range, e.g., within 8% of the luma target 266; (2) the luma target 266 has previously been achieved before the brightness level 264 changes; and (3) the lowest or highest brightness level 264 is reached during the brightness drop/increase process. In the illustrated method, an example of Threshold hold low is 6 and Threshold hold high is 215.

Figure 10:
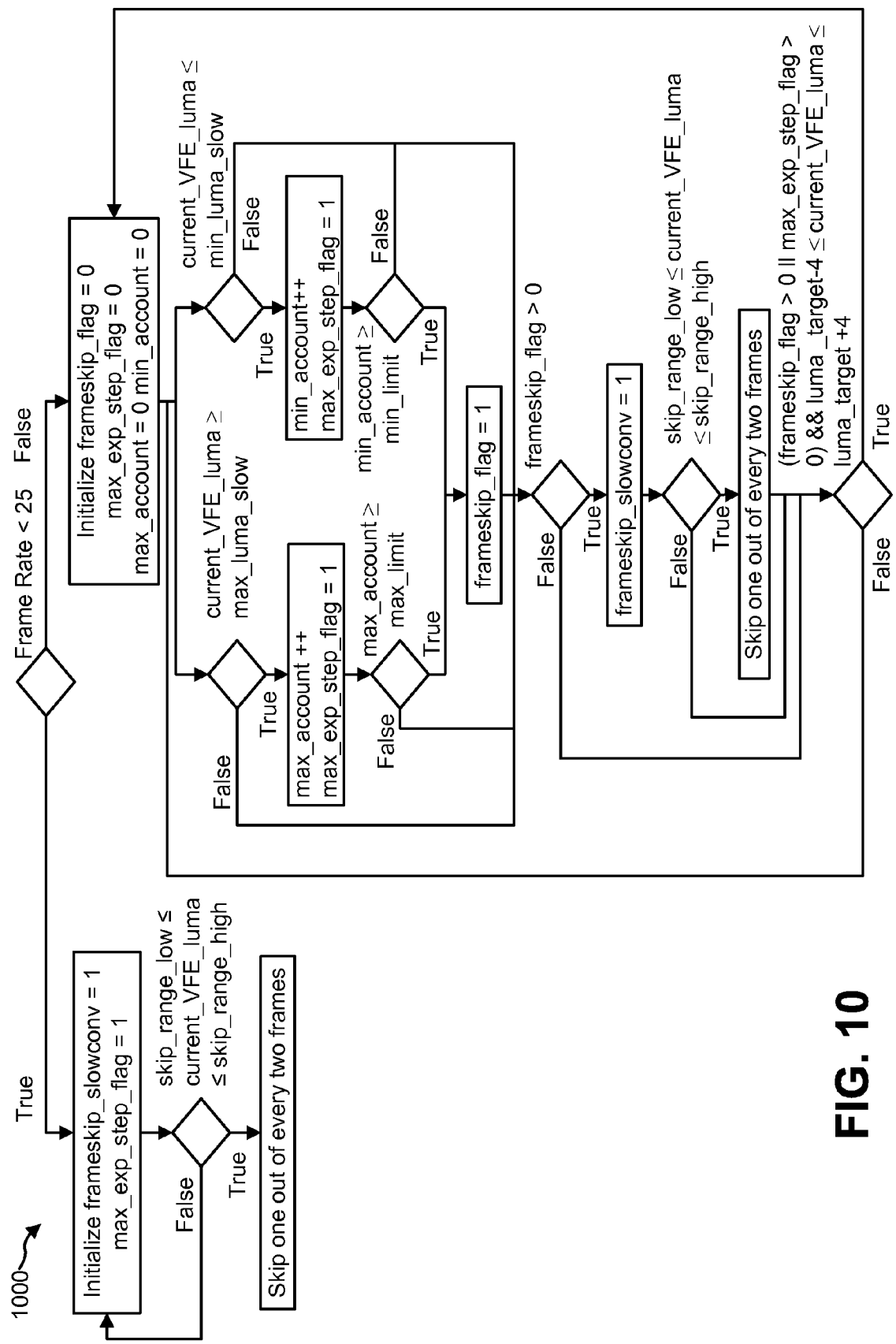
FIG. 10 is a flow diagram illustrating a method for convergence time control during auto exposure control.

FIG. 10 is a flow diagram illustrating a method 1000 for convergence time control during auto exposure control. In other words, the method 1000 illustrated in FIG. 10 may be performed instead of step 720 in the method 700 illustrated in FIG. 7. The method 1000 may be modified if panning is detected based on motion information, i.e., the exposure step size 268 may be increased using Equation (3). The method 1000 may include a low frame rate case and a high frame rate case. The convergence speed may be dependent on the exposure step size 268. To achieve a smooth convergence process, the exposure step sizes 268 may be adjusted according to its stage during the convergence process. Frame skipping may be performed to prevent oscillation or overshoot from occurring during convergence. When the brightness level 264 changes more than a predetermined threshold and the difficulty of bringing the lowest/highest brightness up/down is greater than another threshold, the frame skipping is performed every other frame. Frame skipping is only performed on certain stages during the convergence process to have the least effect on the convergence smoothness.

Figure 11:
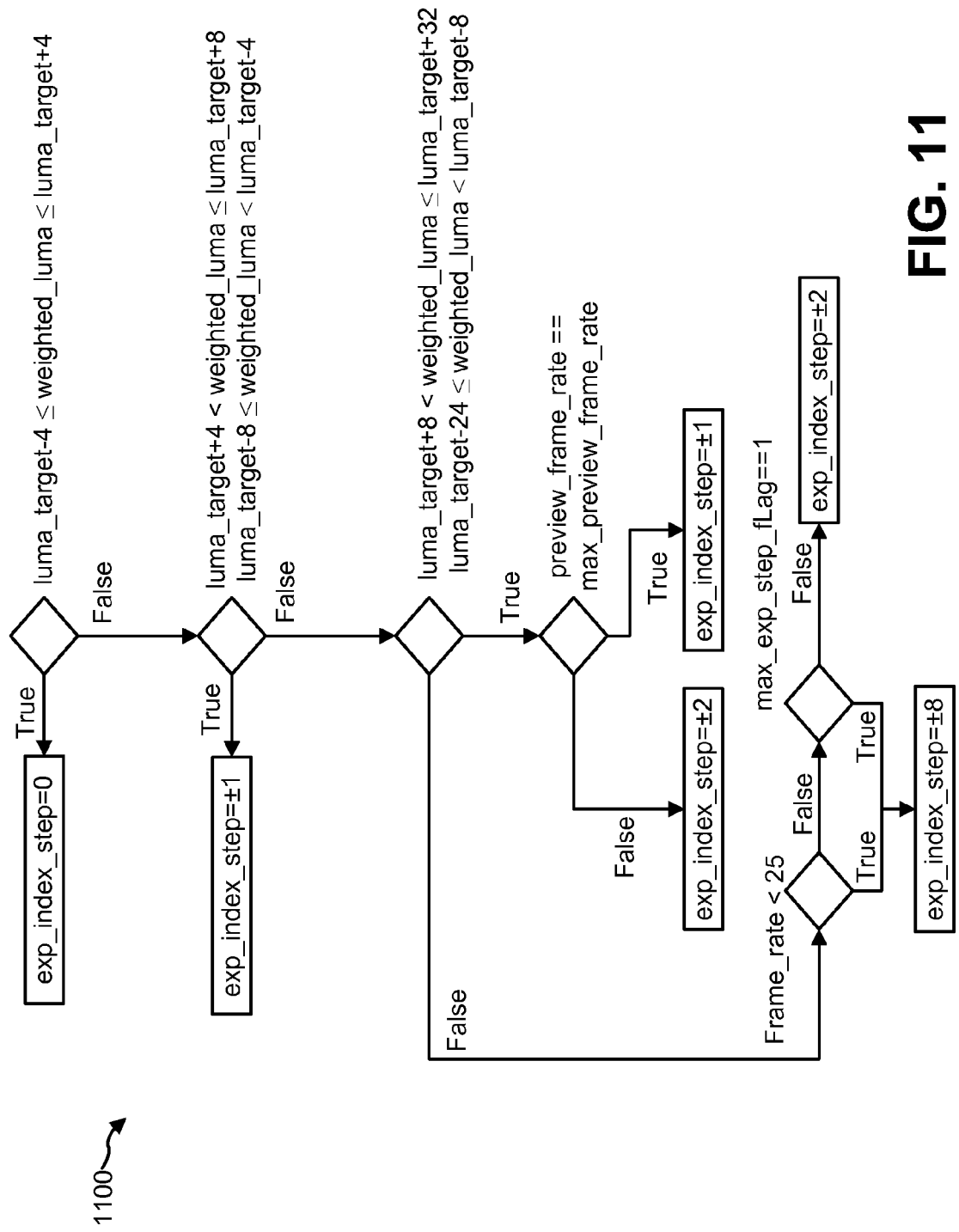
FIG. 11 is a flow diagram illustrating a method for convergence time control during auto exposure control.

FIG. 11 is a flow diagram illustrating a method 1100 for convergence time control during auto exposure control. In other words, the method 1100 illustrated in FIG. 11 may be performed instead of step 722 in the method 700 illustrated in FIG. 7. The method 1100 may be modified if panning is detected based on motion information, i.e., the exposure step size 268 may be increased using Equation (3). The exposure step size 268 may be dependent on the current stage of the convergence process and the overall brightness level 264 change. The exposure step size 238 may be 0, +1, −1, +2, −2, +8, or −8 depending on the conditions illustrated in the left side of the method 1100.

Figure 12:
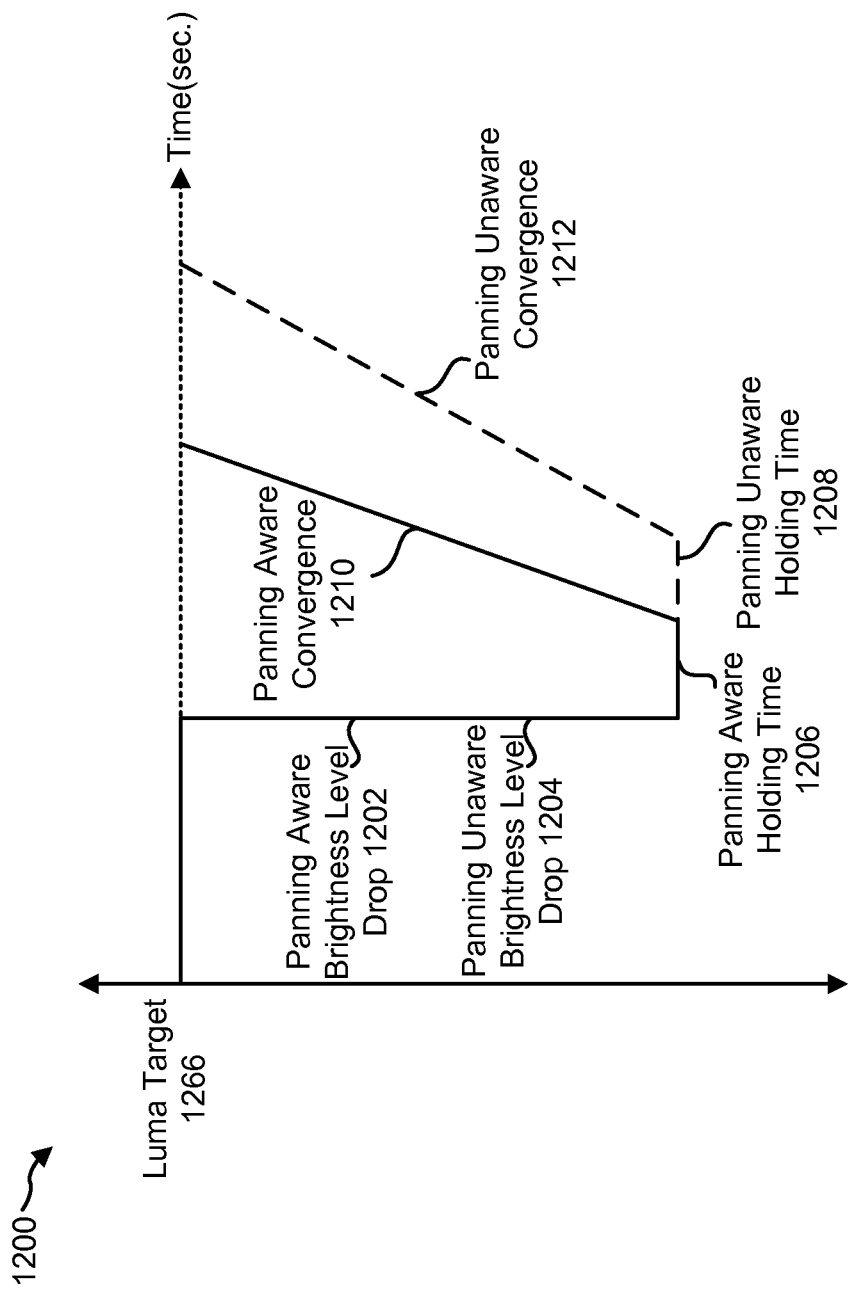
FIG. 12 is a graph illustrating panning aware auto exposure control as a function of time.

FIG. 12 is a graph 1200 illustrating panning aware auto exposure control as a function of time. The graph 1200 includes a panning aware curve (solid line) and a panning unaware curve (dashed line) as a function of time. The panning aware curve may illustrate auto exposure control using motion information. The panning aware curve may include a panning aware brightness drop 1202, a panning aware holding time 1206, and a panning aware convergence 1210. In contrast to the panning aware curve, the panning unaware curve may illustrate auto exposure control without using motion information. The panning unaware curve may include a panning unaware brightness level drop 1204, a panning unaware holding time 1208, and a panning unaware convergence 1212.

Auto exposure control, either panning aware or panning unaware, may occur when a brightness level 264 drops below an acceptable range of a luma target 1266, e.g., 8% of the luma target 1266. After a qualifying brightness level 264 drop, an auto exposure control module 246 may perform auto exposure control based on motion information. Specifically, a holding time may be determined based on motion information. If panning aware auto exposure is used, the panning aware holding time 1206 may be 40-60% less than the panning unaware holding time 1208. The panning unaware holding time 1208 may be a constant, (e.g., about 1 second), or may be determined by the auto exposure control module 246. After the holding time, the auto exposure control module 246 may then adjust an exposure step size 268 until the brightness level 264 converges back within an acceptable range of the luma target 1266. Panning aware convergence 1210 may be faster because the exposure step size 268 may be increased faster than the panning unaware convergence 1212 based on an incrementing function 274.

Figure 13:
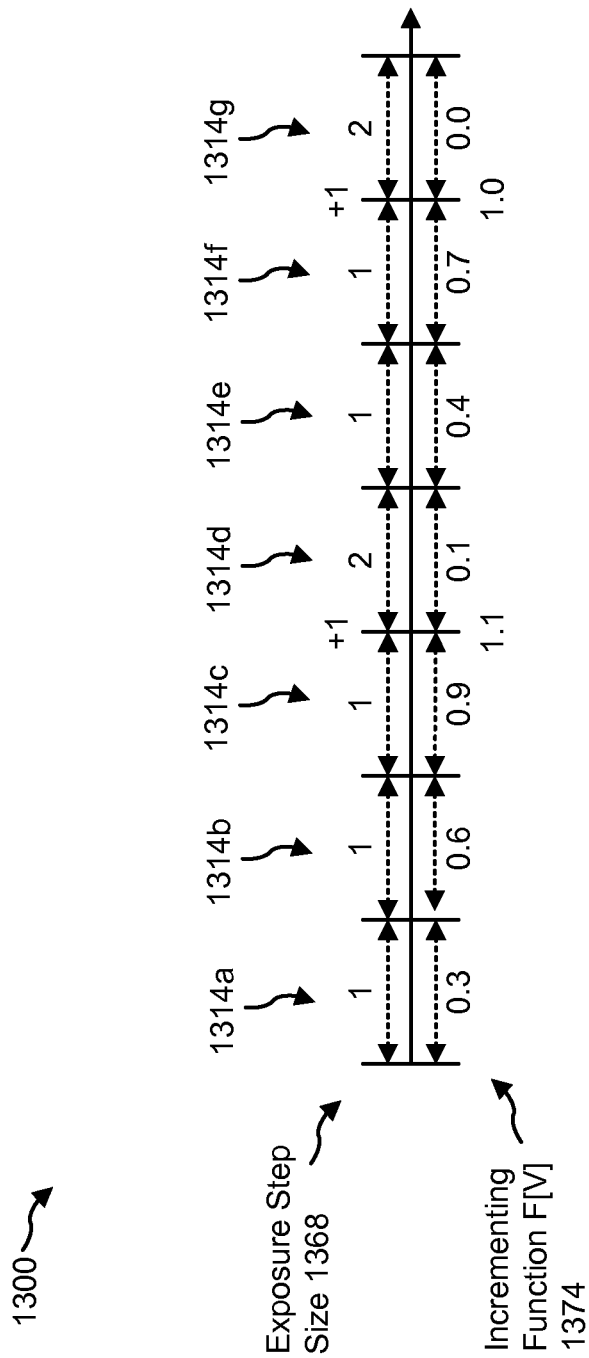
FIG. 13 is a graph illustrating increases in an exposure step size during panning aware auto exposure control.

FIG. 13 is a graph 1300 illustrating increases in an exposure step size 1368 during panning aware auto exposure control. Specifically, the graph 1300 illustrates seven segments 1314a-g, each of which may represent a frame 122 of captured video. The numbers on the top side of the graph 1300 may represent the exposure step size 1368 sent as a configuration parameter 212. For example, the exposure step size 1368 is 1 for the first segment 1314a, 1 for the second segment 1314b, 1 for the third segment 1314c, etc. The numbers on the bottom side of the graph 1300 may represent the value of an incrementing function (F[V]) 1374 that may be used to adjust the exposure step size 1368, e.g., using Equation (3). The incrementing function (F[V]) 1374 may be based on the panning speed as indicated by motion information and may be in the range [0,1]. For example, the incrementing function 1374 is 0.3 for the first segment 1314a, 0.6 for the second segment 1314b, and 0.9 for the third segment 1314c. However, when 0.2 is added to the incrementing function (F[V]) 1374 before the fourth segment 1314d, the incrementing function (F[V]) 1374 for the fourth segment 1314d may wrap around to 0.1 instead of 1.1 and the exposure step size 1368 for the fourth segment 1314d may be increased from 1 to 2 according to Equation (3). In other words, the incrementing function 1374 may be accumulated until it reaches 1 or more, at which point the corresponding exposure step size 1368 may be increased or reduced by 1. Similarly, as the incrementing function 1374 reaches 1 again at the end of the sixth segment 1314f, the incrementing function (F[V]) 1374 for the seventh segment 1314g may wrap around to 0.0 instead of 1.0 and the exposure step size 1368 for the seventh segment 1314g may be increased from 1 to 2.

Figure 14:
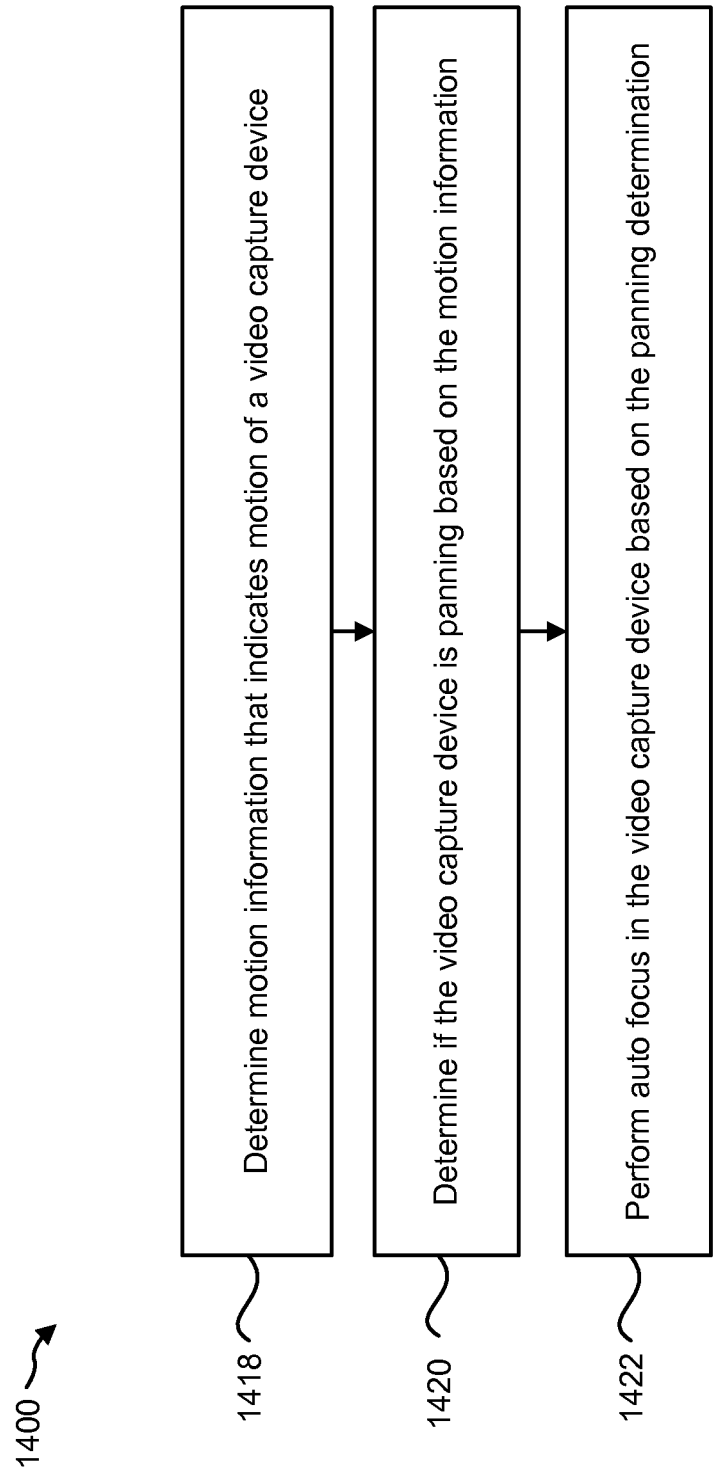
FIG. 14 is a flow diagram illustrating a method for auto focusing a video capture device based on motion information.

FIG. 14 is a flow diagram illustrating a method 1400 for auto focusing a video capture device 102 based on motion information. The method 1400 may be performed by a motion detection module 216 and an auto focus module 248 in a video processor 208. When panning, it may be desirable to avoid re-focusing since the view of the video capture device 102 window may be changing. Therefore, motion information may be used to assist the auto focus module 248 to determine whether to re-focus. The motion detection module 216 may determine 1418 motion information that indicates motion of a video capture device 102, e.g., a global motion vector 232. The motion information may be a motion vector. Alternatively, other types of motion information may be used, e.g., data from an accelerometer 242. The auto focus module 248 may determine 1420 if the video capture device 102 is panning based on the motion information. One possible way to determine panning may be to use Equation (4). However, since this may not be very accurate, the auto focus module 248 may instead use the motion vector length 262 to determine panning, i.e., a panning detection 276 is true if the motion vector length 262 is larger than a predetermined threshold and false if the motion vector length 262 is less than a predetermined threshold. The auto focus module 248 may also perform 1422 auto focusing in the video capture device 102 based on the panning determination. This may include sending the panning detection 276 as a configuration parameter 212 to a sensor configuration module 110. For example, the video capture device 102 may re-focus only if the panning detection 276 is false.

Additionally, local motion vectors 240 may be used to assist the auto focus module 248 for object tracking In other words, the size, shape, and position of a focus window may be adjusted such that the object of interest is brought into focus. This may occur for object tracking with moving backgrounds or close-to-still backgrounds.

Figure 15:
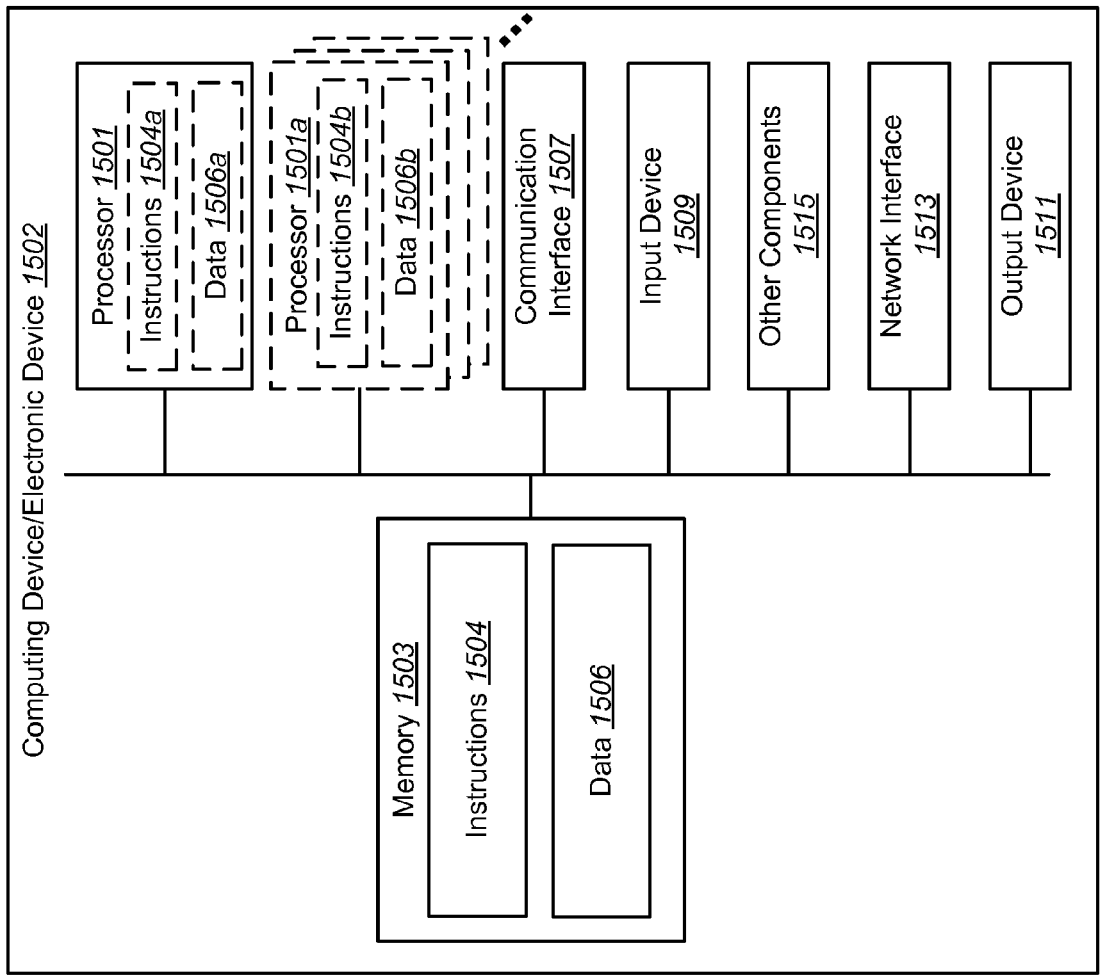
FIG. 15 is a block diagram illustrating various components that may be utilized in a computing device/electronic device.

FIG. 15 is a block diagram illustrating various components that may be utilized in a computing device/electronic device 1502. The computing device/electronic device 1502 may implement a video capture device 102. Computing devices/electronic devices 1502 may include the broad range of digital computers including microcontrollers, hand-held computers, personal computers, servers, mainframes, supercomputers, minicomputers, workstations, and any variation or related device thereof.

The computing device/electronic device 1502 is shown with a processor 1501 and memory 1503. The processor 1501 may control the operation of the computing device/electronic device 1502 and may be embodied as a microprocessor, a microcontroller, a digital signal processor (DSP) or other device known in the art. The processor 1501 typically performs logical and arithmetic operations based on program instructions 1504 stored within the memory 1503. The instructions 1504 in the memory 1503 may be executable to implement the methods described herein.

The computing device/electronic device 1502 may also include one or more communication interfaces 1507 and/or network interfaces 1513 for communicating with other computing/electronic devices. The communication interface(s) 1507 and the network interface(s) 1513 may be based on wired communication technology, wireless communication technology, or both.

The computing device/electronic device 1502 may also include one or more input devices 1509 and one or more output devices 1511. The input devices 1509 and output devices 1511 may facilitate user input. Other components 1515 may also be provided as part of the computing device/electronic device 1502.

Data 1506 and instructions 1504 may be stored in the memory 1503. The processor 1501 may load and execute instructions 1504 from the memory 1503 to implement various functions. Executing the instructions 1504 may involve the use of the data 1506 that is stored in the memory 1503. The instructions 1504 are executable to implement one or more of the processes or configurations shown herein, and the data 1506 may include one or more of the various pieces of data described herein. When the processor 1501 executes the instructions 1504, various portions of the instructions 1504a may be loaded onto the processor 1501, and various pieces of data 1506a may be loaded onto the processor 1501.

The memory 1503 may be any electronic component capable of storing electronic information. The memory 1503 may be embodied as random access memory (RAM), read only memory (ROM), magnetic disk storage media, optical storage media, flash memory devices in RAM, on-board memory included with the processor, EPROM memory, EEPROM memory, an ASIC (Application Specific Integrated Circuit), registers, and so forth, including combinations thereof.

Alternatively, or in addition to, there may be more than one processor 1501a, which may operate in parallel to load instructions 1504b and data 1506b and execute the instructions 1504b using the data 1506b. These instructions 1504b may include performing auto white balance, auto exposure control, and/or auto focusing.

In the above description, reference numbers have sometimes been used in connection with various terms. Where a term is used in connection with a reference number, this is meant to refer to a specific element that is shown in one or more of the Figures. Where a term is used without a reference number, this is meant to refer generally to the term without limitation to any particular Figure.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may comprise a single computer-readable statement or many computer-readable statements.

The functions described herein may be implemented in hardware, software, firmware, or any combination thereof. If implemented in software, the functions may be stored as one or more instructions on a computer-readable medium. The term "computer-readable medium" refers to any available medium that can be accessed by a computer. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

Further, it should be appreciated that modules and/or other appropriate means for performing the methods and techniques described herein, such as those illustrated by FIGS. 6, 8, and 14, can be downloaded and/or otherwise obtained by a device. For example, a device may be coupled to a server to facilitate the transfer of means for performing the methods described herein. Alternatively, various methods described herein can be provided via a storage means (e.g., random access memory (RAM), read only memory (ROM), a physical storage medium such as a compact disc (CD) or floppy disk, etc.), such that a device may obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method for adjusting parameters in a video capture device based on motion information, comprising:
   determining motion information by a video capture device that indicates motion of the video capture device;
   waiting an exposure convergence holding time, which is based on the motion information, before converging to a range of a luma target;
   increasing an exposure step size based on the motion information; and
   adjusting a brightness level of the video capture device based on the exposure step size.

2. The method of claim 1, wherein the motion information is determined using data received from an accelerometer in the video capture device, and wherein the motion information comprises an estimated average velocity of the video capture device.

3. The method of claim 1, wherein the motion information is a motion vector.

4. The method of claim 3, wherein the determining a motion vector comprises:
   summing pixel values in each row of a first frame to form a first column vector;
   summing pixel values in each row of a second frame to form a second column vector;
   summing pixel values in each column of the first frame to form a first row vector;
   summing pixel values in each column of the second frame to form a second row vector;
   determining a first shift needed to reach a peak value of autocorrelation of the first row vector and the second row vector, wherein the first shift comprises a horizontal component of the motion vector; and
   determining a second shift needed to reach a peak value of autocorrelation of the first column vector and the second column vector, wherein the second shift comprises a vertical component of the motion vector.

5. The method of claim 3, wherein the increasing an exposure step size is dependent on a length of the motion vector.

6. The method of claim 1, wherein the adjusting the exposure convergence holding time comprises reducing the exposure convergence holding time by forty percent to sixty percent.

7. The method of claim 1, further comprising detecting a drop in the brightness level to a value outside a predetermined range of a luma target.

8. The method of claim 3, further comprising:
   comparing the motion vector to an upper bound and a lower bound;
   determining an aggressiveness level based on the comparison, wherein the aggressiveness level indicates a change in a white balance gain for the video capture device; and
   determining a new white balance gain for the video capture device based on the aggressiveness level.

9. The method of claim 8, wherein the determining the aggressiveness level comprises:
   setting the aggressiveness level to zero if a length of the motion vector is less than or equal to the lower bound;
   setting the aggressiveness level to a value that is proportional to the length of the motion vector if the length of the motion vector is greater than the lower bound and less than the upper bound; and
   setting the aggressiveness level to a predetermined maximum if the length of the motion vector is greater than or equal to the upper bound.

10. The method of claim 1, further comprising:
    determining if the video capture device is panning based on the motion information; and
    performing auto focus in the video capture device based on the panning determination.

11. The method of claim 10, wherein the performing auto focus comprises not performing auto focus if panning is detected and performing auto focus if panning is not detected.

12. An apparatus for adjusting parameters in a video capture device based on motion information, the apparatus comprising:
    a processor;
    memory in electronic communication with the processor;
    instructions stored in the memory, the instructions being executable by the processor to:
      determine motion information that indicates motion of a video capture device;
      wait an exposure convergence holding time, which is based on the motion information, before converging to a range of a luma target;
      increase an exposure step size based on the motion information; and
      adjust a brightness level of the video capture device based on the exposure step size.

13. The apparatus of claim 12, wherein the motion information is determined using data received from an accelerometer in the video capture device, and wherein the motion information comprises an estimated average velocity of the video capture device.

14. The apparatus of claim 12, wherein the motion information is a motion vector.

15. The apparatus of claim 14, wherein the instructions executable to determine a motion vector comprise instructions executable to:
    sum pixel values in each row of a first frame to form a first column vector;
    sum pixel values in each row of a second frame to form a second column vector;
    sum pixel values in each column of the first frame to form a first row vector;
    sum pixel values in each column of the second frame to form a second row vector;
    determine a first shift needed to reach a peak value of autocorrelation of the first row vector and the second row vector, wherein the first shift comprises a horizontal component of the motion vector; and
    determine a second shift needed to reach a peak value of autocorrelation of the first column vector and the second column vector, wherein the second shift comprises a vertical component of the motion vector.

16. The apparatus of claim 14, wherein the increasing an exposure step size is dependent on a length of the motion vector.

17. The apparatus of claim 12, wherein the instructions executable to adjust the exposure convergence holding time comprise instructions executable to reduce the exposure convergence holding time by forty percent to sixty percent.

18. The apparatus of claim 12, further comprising instructions executable to detect a drop in the brightness level to a value outside a predetermined range of a luma target.

19. The apparatus of claim 14, further comprising instructions executable to:

compare the motion vector to an upper bound and a lower bound;

determine an aggressiveness level based on the comparison, wherein the aggressiveness level indicates a change in a white balance gain for the video capture device; and determine a new white balance gain for the video capture device based on the aggressiveness level.

20. The apparatus of claim 19, wherein the instructions executable to determine the aggressiveness level comprise instructions executable to:

set the aggressiveness level to zero if a length of the motion vector is less than or equal to the lower bound;

set the aggressiveness level to a value that is proportional to the length of the motion vector if the length of the motion vector is greater than the lower bound and less than the upper bound; and set the aggressiveness level to a predetermined maximum if the length of the motion vector is greater than or equal to the upper bound.

21. The apparatus of claim 12, further comprising instructions executable to:

determine if the video capture device is panning based on the motion information; and perform auto focus in the video capture device based on the panning determination.

22. The apparatus of claim 21, wherein the instructions executable to perform auto focus comprise instructions executable to not perform auto focus if panning is detected and to perform auto focus if panning is not detected.

23. A computer-program product for adjusting parameters in a video capture device, the computer-program product comprising a computer-readable medium having instructions thereon, the instructions comprising:

code for determining motion information that indicates motion of a video capture device;

code for waiting an exposure convergence holding time, which is based on the motion information, before converging to a range of a luma target;

code for increasing an exposure step size based on the motion information; and code for adjusting a brightness level of the video capture device based on the exposure step size.

24. The computer-program product of claim 23, wherein the increasing an exposure step size is dependent on a length of a motion vector.

25. The computer-program product of claim 23, wherein the code for adjusting the exposure convergence holding time comprises code for reducing the exposure convergence holding time by forty percent to sixty percent.

26. The computer-program product of claim 23, further comprising code for detecting a drop in the brightness level to a value outside a predetermined range of a luma target.

27. The computer-program product of claim 23, wherein the motion information is a motion vector, and further comprising:

code for comparing the motion vector to an upper bound and a lower bound;

code for determining an aggressiveness level based on the comparison, wherein the aggressiveness level indicates a change in a white balance gain for the video capture device; and code for determining a new white balance gain for the video capture device based on the aggressiveness level.

28. The computer-program product of claim 23, further comprising:

code for determining if the video capture device is panning based on the motion information; and code for performing auto focus in the video capture device based on the panning determination.

29. An apparatus for adjusting parameters in a video capture device, the apparatus comprising:

means for determining motion information that indicates motion of a video capture device;

means for waiting an exposure convergence holding time, which is based on the motion information, before converging to a range of a luma target;

means for increasing an exposure step size based on the motion information; and means for adjusting a brightness level of the video capture device based on the exposure step size.

30. The apparatus of claim 29, wherein the motion information is a motion vector.

31. The apparatus of claim 30, wherein the increasing an exposure step size is dependent on a length of the motion vector.

32. The apparatus of claim 29, wherein the means for adjusting the exposure convergence holding time comprise means for reducing the exposure convergence holding time by forty percent to sixty percent.

33. The apparatus of claim 29, further comprising means for detecting a drop in the brightness level to a value outside a predetermined range of a luma target.

34. The apparatus of claim 30, further comprising:

means for comparing the motion vector to an upper bound and a lower bound;

means for determining an aggressiveness level based on the comparison, wherein the aggressiveness level indicates a change in a white balance gain for the video capture device; and means for determining a new white balance gain for the video capture device based on the aggressiveness level.

35. The apparatus of claim 29, further comprising:

means for determining if the video capture device is panning based on the motion information; and means for performing auto focus in the video capture device based on the panning determination.

* * * * *